(12) United States Patent
Tsunehara et al.

(10) Patent No.: US 7,290,840 B2
(45) Date of Patent: Nov. 6, 2007

(54) VEHICLE BRAKE SYSTEM

(75) Inventors: Hiroshi Tsunehara, Kanagawa (JP); Hideto Murakami, Kanagawa (JP); Takaaki Eguchi, Yokohama (JP); Masanori Hara, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 11/389,156

(22) Filed: Mar. 27, 2006

(65) Prior Publication Data

US 2006/0163942 A1 Jul. 27, 2006

Related U.S. Application Data

(62) Division of application No. 10/830,055, filed on Apr. 23, 2004, now Pat. No. 7,059,691.

(30) Foreign Application Priority Data

| Apr. 24, 2003 | (JP) | ............................. 2003-119646 |
| Apr. 28, 2003 | (JP) | ............................. 2003-124358 |
| Jan. 9, 2004 | (JP) | ............................. 2004-004176 |

(51) Int. Cl.
*B60T 13/18* (2006.01)

(52) U.S. Cl. ............................. 303/11; 303/3; 303/13; 303/15

(58) Field of Classification Search .................... 303/3, 303/9.61, 9.62, 10, 11, 13, 15, 152, 113.5
See application file for complete search history.

(56) References Cited

U.S. PATENT DOCUMENTS

| 4,674,804 A | 6/1987 | Burgdorf et al. |
| 4,714,296 A * | 12/1987 | Imoto et al. ............... 303/9.62 |
| 4,792,192 A * | 12/1988 | Tveitane ....................... 303/13 |
| 5,460,436 A * | 10/1995 | Volz et al. ............... 303/113.2 |
| 5,472,264 A | 12/1995 | Klein et al. |
| 5,615,933 A | 4/1997 | Kidston et al. |
| 6,007,164 A | 12/1999 | Sakai et al. |
| 6,267,454 B1 | 7/2001 | Takahashi |
| 6,811,229 B2 | 11/2004 | Soga |
| 2002/0050739 A1 | 5/2002 | Koepff et al. |

FOREIGN PATENT DOCUMENTS

| DE | 42 26 646 A1 | 2/1994 |
| DE | 44 01 995 C1 | 4/1995 |
| DE | 198 25 278 A1 | 12/1999 |
| EP | 0 649 781 A1 | 4/1995 |
| JP | 07-117644 A | 9/1995 |
| JP | 2653224 B2 | 5/1997 |
| JP | 2000-168536 A | 6/2000 |
| KP | 10200428033 | 5/1995 |
| WO | WO 95/05299 A1 | 2/1995 |
| WO | WO 01/07307 A1 | 2/2001 |

* cited by examiner

*Primary Examiner*—Melanie Torres
(74) *Attorney, Agent, or Firm*—Foley & Lardner LLP

(57) ABSTRACT

A brake system for a vehicle is comprised of a first brake system that mechanically applies a braking force to wheels according to a master cylinder hydraulic pressure outputted from a master cylinder which receives a brake manipulation force of a driver, and a second brake system that apply a braking force to other wheels according to at least a braking state of the first brake system.

8 Claims, 18 Drawing Sheets

VEHICLE BRAKE SYSTEM

The present application is a divisional of U.S. application Ser. No. 10/830,055, filed Apr. 23, 2004 now U.S. Pat. No. 7,059,691, the entire contents of which are incorporated herein by reference.

BACKGROUND OF THE INVENTION

The present invention relates to a vehicle brake control system, and more particularly to a brake system which is employed in combination with a regenerative brake apparatus and which is capable of electronically controlling a braking force of a vehicle according to a brake manipulation force, which comprises a regenerative brake apparatus.

In case that a coordinated brake system is constructed by a regenerative brake apparatus and a friction brake apparatus of a hydraulic or electromotive type which generates a braking force according to the brake manipulation force generated by a driver and a regenerative brake system, it is necessary to electronically control the friction brake apparatus so as to effectively consume a regenerative braking force in view of energy efficiency. During such an electronic control of the coordinated brake system, a demand braking force corresponding to a driver's intent is generated by the friction brake apparatus and the regenerative brake apparatus, and the regenerative braking force is consumed with a priority relative to the braking force generated by the friction brake apparatus.

Japanese Published Patent Application No. 2000-168536 discloses a vehicle brake system which is capable of electronically controlling a braking force. The vehicle brake system comprises a shutoff valve for closing a fluid communication between a master cylinder and wheel cylinders during the electronic brake control, and a hydraulic pressure source constructed by a pump for discharging the working fluid of a reservoir, a motor for driving the pump, and an accumulator for storing the working fluid discharged from the pump. During the electronic control of this brake system, a brake hydraulic pressure in the wheel cylinder is electronically controlled regardless of the master cylinder hydraulic pressure, by using an accumulator inner hydraulic pressure of the hydraulic pressure source through the control of pressure increasing and decreasing valves.

SUMMARY OF THE INVENTION

However, such an electronically controlled brake system requires a shutoff valve and a stroke simulator to avoid the stroke and reaction force of a brake pedal from varying by the execution of the electronic control and to maintain a brake pedal manipulation feeling. The provision of these devices in the brake system increases a production cost of the brake system.

It is therefore an object of the present invention to provide an improved vehicle brake system which is capable of electronically controlling the braking force without employing a shutoff valve and a stroke simulator.

An aspect of the present invention resides in a brake system for a vehicle which comprises a first brake system that mechanically applies a braking force to wheels according to a master cylinder hydraulic pressure outputted from a master cylinder which receives a brake manipulation force of a driver, and a second brake system that applies a braking force to other wheels according to at least a braking state of the first brake system.

Another aspect of the present invention resides in a method of controlling a vehicle brake system, which comprises an operation of mechanically applying a first braking force to wheels according to a master cylinder hydraulic pressure outputted from a master cylinder which receives a brake manipulation force of a driver; and an operation of applying a second braking force to other wheels according to at least a braking state of a brake system of generating the first braking force.

The other objects and features of this invention will become understood from the following description with reference to the accompanying drawings.

DETAILED DESCRIPTION OF THE INVENTION

Figure 1:
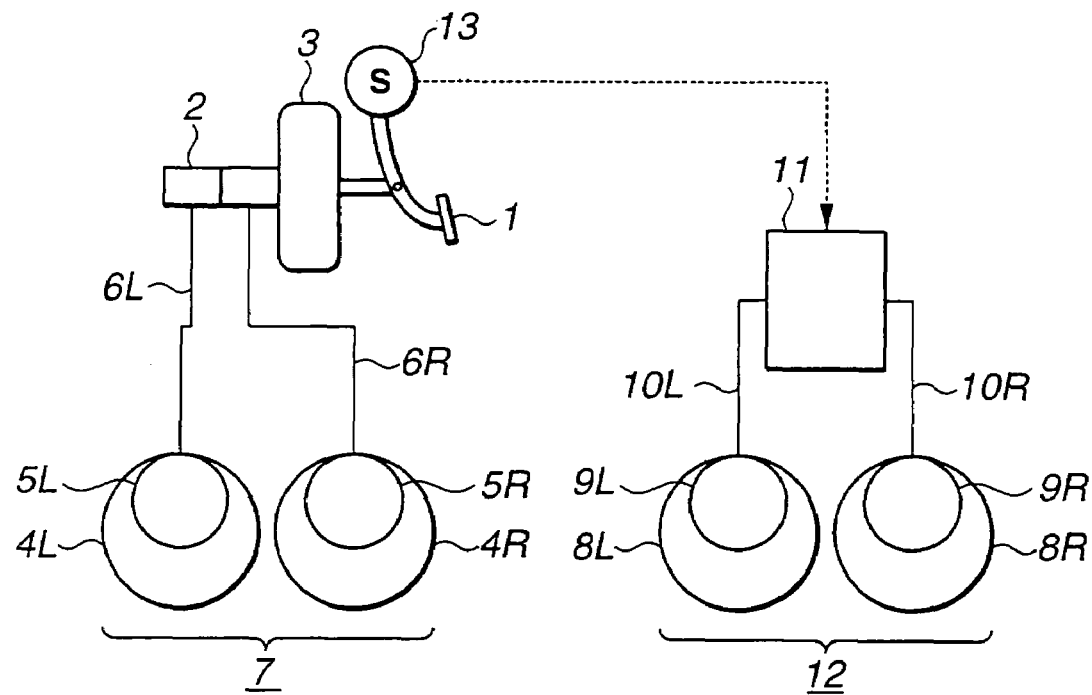
FIG. 1 is a schematic system view showing a first embodiment of a brake system according to the present invention.

Referring to FIG. 1, there is shown a first embodiment of a brake system for a vehicle in accordance with the present invention. The brake system comprises a brake pedal 1 which is depressed by a driver to generate a brake manipulation force and a master cylinder 2 which receives the brake manipulation force from brake pedal 1. A booster 3 is disposed between brake peal 1 and master cylinder 2 and may be of a negative pressure type, positive pressure type or hydraulic pressure type. Booster 3 boosts the brake manipulation force of brake pedal 1 and supplies the boosted brake manipulation force to master cylinder 2.

Master cylinder 2 is a tandem master cylinder having two hydraulic pressure outlets. Brake conduits 6L and 6R extend from the two hydraulic pressure outlets to brake units 5L and 5R of right and left front wheels 4L and 4R, respectively. Each of brake units 5L and 5R includes a brake drum or disc brake. These two independent circuits construct a first brake system 7. Brake units 9L and 9R of right and left rear wheels 8L and 8R are connected to a rear wheel braking force control apparatus 11 through brake conduits 10L and 10R, respectively. Each of brake units 9L and 9R includes a brake drum or disc brake. These two independent circuits construct a second brake system 12.

Rear braking force control apparatus 11 is constructed by a brake hydraulic pressure source including a electromotive pump and an accumulator, pressure increasing and decreasing valves for determining brake hydraulic pressures to be supplied to brake conduits 10L and 10R using the hydraulic pressure generated by the brake hydraulic pressure source as a base pressure, and a controller for controlling these pressure increasing and decreasing valves.

This controller of rear braking force control apparatus 11 receives a brake stroke signal indicative of a depression stroke S of brake pedal 1. The controller comprises a first braking force calculating means for calculating a front wheel braking force to be generated by first brake system 7 on the basis of the brake stroke signal, a target deceleration calculating means for calculating a demand deceleration of the vehicle on the basis of the brake stroke signal, and a second braking force calculating means for calculating a target rear wheel braking force of second brake system 12 which is capable of achieving the demand deceleration in coordination with the front braking force of first brake system 7. The controller controls the pressure increasing valve and the pressure decreasing valve so that second brake system 21 achieves the target rear wheel braking force.

With the thus arranged first embodiment according to the present invention, since first brake system 7 mechanically applies a braking force to front wheels 4L and 4R according to the master cylinder hydraulic pressure, it becomes possible to brake front wheels 4L and 4R with a braking force according to the brake manipulation force generated at brake pedal 1 through the depressing operation of the driver.

On the other hand, since second brake system 12 controls the braking of rear wheels 8L and 8R according to the brake pedal stroke S indicative of the braking condition of at least first brake system 7, it becomes possible to freely control the braking force of rear wheels 8L and 8R with reference to brake pedal stroke S. Further, during the control of second brake system 21, first brake system mechanically brakes front wheels 4L and 4R, and therefore it becomes possible to freely control the braking of rear wheels 8L and 8R using the second brake system while getting a brake pedal manipulating feeling, without newly providing a shut off valve and a stroke simulator. This arrangement according to the present invention enables the brake control without increasing a number of parts of the brake system and thereby getting advantages in cost.

Further, since the braking force of first brake system 7 is mechanically determined, it is not necessary to execute a calculation for the control of first brake system 7, only a calculation for setting the target braking force of second brake system 12 so as to achieve the demand braking force of the vehicle in coordination with the breaking force of first brake system. This largely simplifies the calculations for the brake control and thereby improving the responsibility of the brake system. Furthermore, since the brake system is arranged such that the brake manipulation force at brake pedal 1 is boosted by booster 3 and is then inputted to master cylinder 2, the following advantages are obtained.

If a motor-driven pump for a brake hydraulic pressure source of all wheels of a conventional brake system is rendered inoperative by electrical trouble, all wheels are put in a braking disabled state. Accordingly, the conventional brake system is generally arranged to take a countermeasure of supplying the master cylinder hydraulic pressure brake units for all wheels by opening a shutoff valve if such an electrical trouble is caused. However, such a conventional brake system generally is not provided with a booster, or is provided with a hydraulic pressure type booster-which commonly uses brake fluid of the motor-driven pump. Accordingly, an electric trouble of the brake system disables the boosting operation of the brake manipulation force from the brake pedal to the master cylinder.

In contrast, the brake system according to the first embodiment of the present invention is arranged to input the brake manipulation force from brake pedal 1 to master cylinder 2 through booster 3. Accordingly, even if a pump driving motor in a braking force control apparatus 11 is put in an electric trouble so as not to be capable of operating the pump driving motor, front wheels 4L and 4R are capable of receiving a braking function of booster 3. This arrangement according to the present invention is very advantageous such that a total braking force of the brake system is larger than the braking force of a conventional brake system when it is compared with the conventional brake system wherein a braking function of the booster cannot be executed at all wheels.

Since a boost ratio of a booster generally ranges 6 through 9, the braking force generated under a booster inoperative state is lowered to 1/9 through 1/6 of the normal braking force under the booster operative state. However, the brake system according to the present invention is capable of avoiding the braking force from being largely lowered due to the booster inoperative state such as by an electric trouble.

Further, the first embodiment of the brake system according to the present invention is arranged to employ a tandem master cylinder as master cylinder 2, to construct first brake system 7 by two independent circuits 6L and 6R extending from two master cylinder hydraulic pressure outlets of tandem master cylinder 2 to brake units 5L and 5R for front wheels 4L and 4R. Accordingly, even if one of the two independent circuits 6L and 6R of first brake system 7 is broken, the other of circuits 6L and 6R is capable of generating the braking force. This decreases a lowering degree of the braking force due to the malfunction of first brake system 7.

Figure 2:
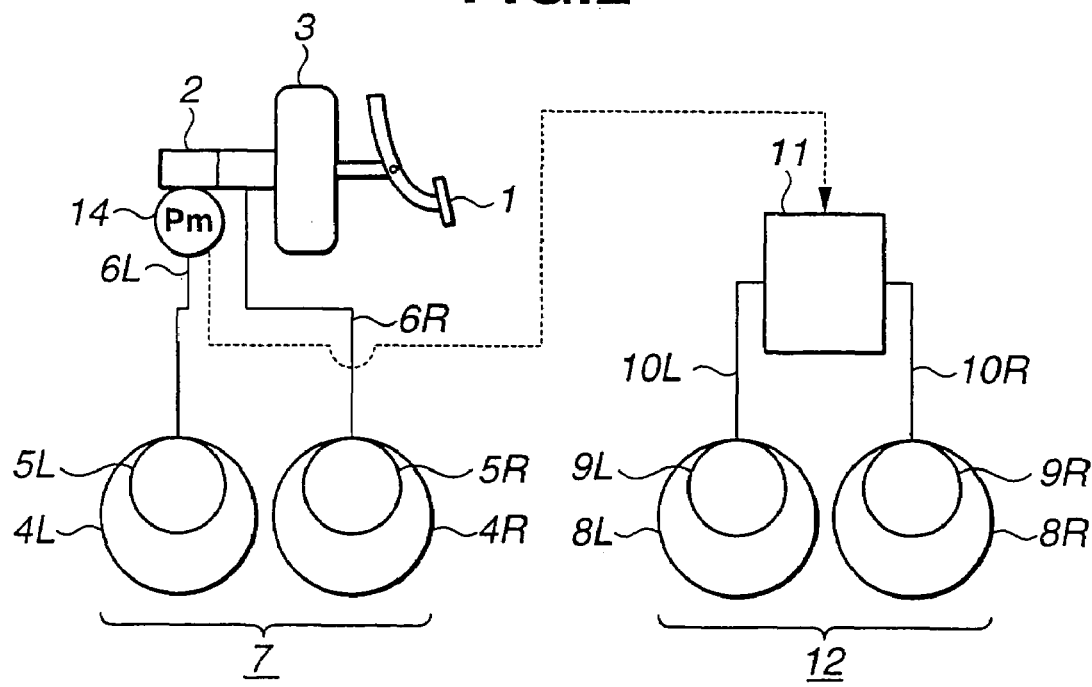
FIG. 2 is a schematic system view showing a modification of the first embodiment.
Figure 3:
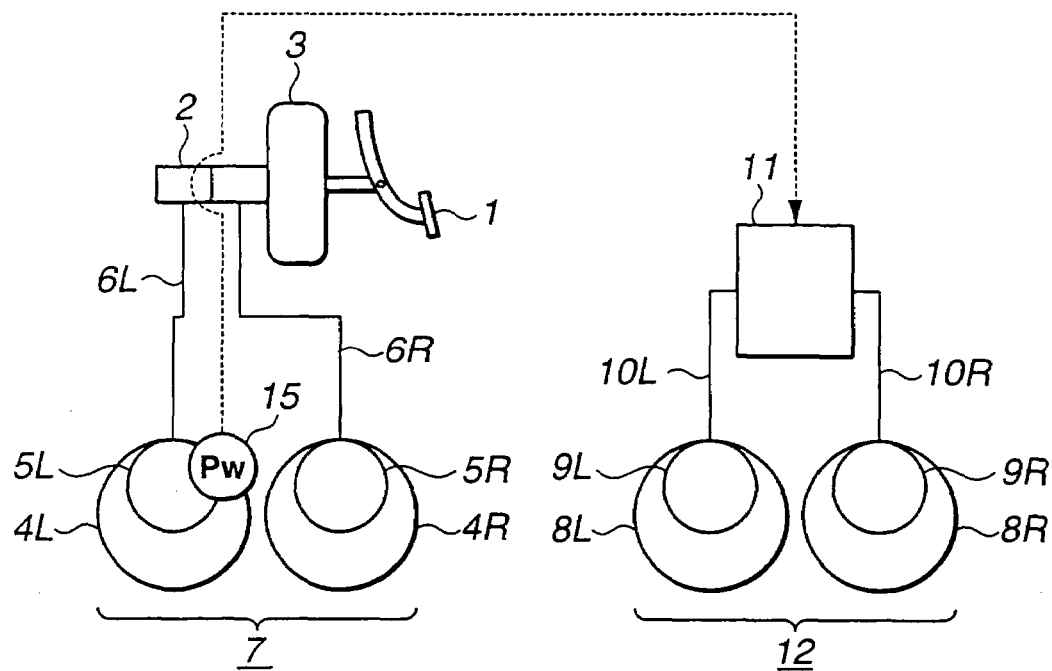
FIG. 3 is a schematic system view showing another modification of the first embodiment.

Although the first embodiment according to the present invention has been shown and described such that brake pedal stroke S detected by stroke sensor 13 is employed as information indicative of a braking state of first brake system 7 to be inputted to rear wheel breaking force control apparatus 11, a signal indicative of a master cylinder hydraulic pressure Pm detected by a master cylinder hydraulic pressure sensor 14 may be employed as information as to the braking state of first brake system 7 as shown in FIG. 2, or a signal indicative of a brake hydraulic pressure Pw detected by a brake hydraulic pressure sensor 15 may be employed as information as to the braking state of first brake system 7 as shown in FIG. 3.

Figure 4:
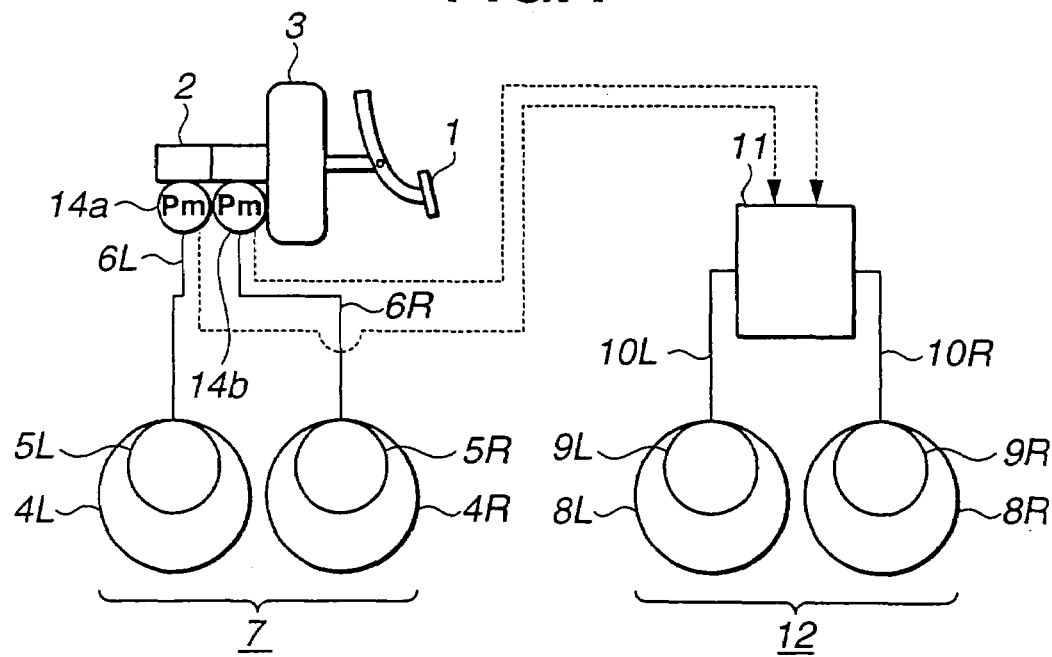
FIG. 4 is a schematic system view showing another modification of the first embodiment.

Even if master cylinder hydraulic pressure Pm shown in FIG. 2 or brake hydraulic pressure Pw shown in FIG. 3 is employed as information indicative of the braking state of first brake system 7, it is preferable that two sensors 14a and 14b are attached to two independent circuits 6L and 6R of first brake system 7, respectively, as shown in FIG. 4, and that information of both sensors 14a and 14b are inputted to rear wheel braking force control apparatus 11.

With this arrangement according to the present invention, even if one of two circuits 6L and 6R becomes inoperative due to some trouble, rear wheel braking force control apparatus 11 is capable of calculating a target rear wheel braking force using information of sensor 14a or 14b of the other correctly operating circuit 6L or 6R. This arrangement is advantageous to improving a reliability of the brake system.

Figure 5:
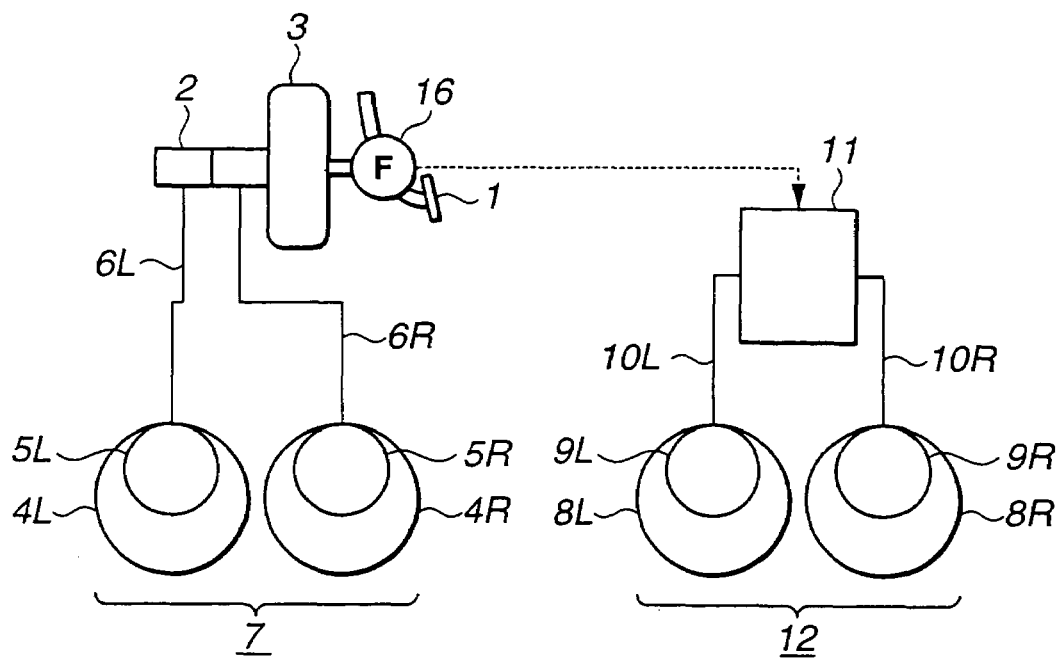
FIG. 5 is a schematic system view showing a second embodiment of the brake system according to the present invention.

FIG. 5 shows a second embodiment of the brake system according to the present invention. The second embodiment is arranged such that a depressing force F (brake manipulation force) of brake pedal 1, which is detected by a depression force sensor 16, is employed as a braking state of first brake system 7 to be inputted to rear wheel braking force control apparatus 11.

Figure 6:
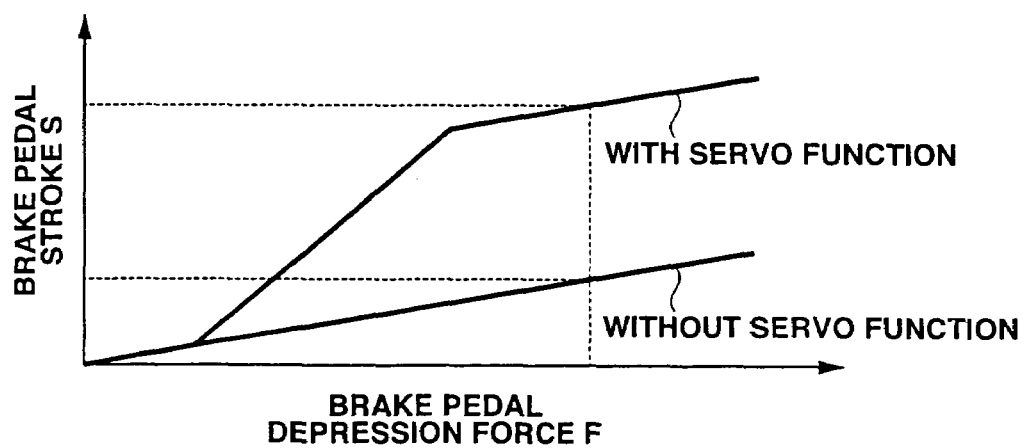
FIG. 6 is a graph showing a relationship between a brake pedal depression force and a brake pedal stroke.

Brake pedal depressing force F and brake pedal stroke S have a relationship shown in FIG. 6. That is, the relationship becomes different according to a condition whether or not booster 3 normally functions. When the braking state of first brake system 7 is determined from brake pedal depression force F (braking manipulation force), the braking force intended by the driver is certainly read from brake pedal depression force F even if booster 3 performing a servo function is put in malfunction state. Accordingly, the brake system of this embodiment is capable of accurately obtaining the demand braking force of the vehicle and of further accurately executing the braking force control.

Although the embodiments shown in FIGS. 1 through 5 have been shown and described such that first brake system 7, which mechanically responses to the master cylinder hydraulic pressure, is employed as a brake system for left and right front wheels 4L and 4R, and second brake system 12, which responses to the braking state of first brake system 7, is employed as a brake system for left and right rear wheels 8L and 8R, it will be understood that the relationship may be exchanged and that the brake system exchanged achieves the advantages gained by the embodiments shown in FIGS. 1 through 5.

Further, the brake system may be arranged such that first brake system 7, which mechanically responses the master cylinder hydraulic pressure, is employed as a brake system for left front wheel 4L and right rear wheel 8R, and second brake system 12, which responses to the braking state of first brake system 7, is employed as a brake system for right front wheel 4R and left rear wheel 8L.

Figure 7:
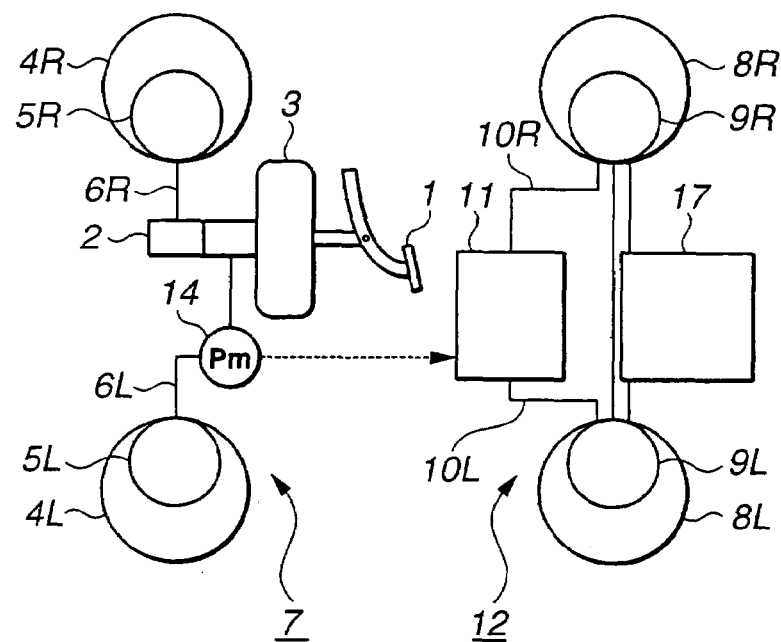
FIG. 7 is a schematic system view showing a third embodiment of the brake system according to the present invention.

FIG. 7 shows a third embodiment of the brake system according to the present invention. This third embodiment newly comprises a regenerative brake apparatus 17 in addition to comprising elements shown in FIG. 2. Elements as same as those in FIG. 2 are denoted by the same reference numerals, and the explanation thereof is omitted herein.

Regenerative brake apparatus 17 is arranged to apply regenerative braking force to rear wheels 8L and 8R. More specifically, regenerative brake apparatus 17 generates a braking force for rear wheels 8L and 8R by converging rotational energy of rear wheels 8L and 8R into electric energy and storing the obtained electric energy in a battery.

Figure 8:
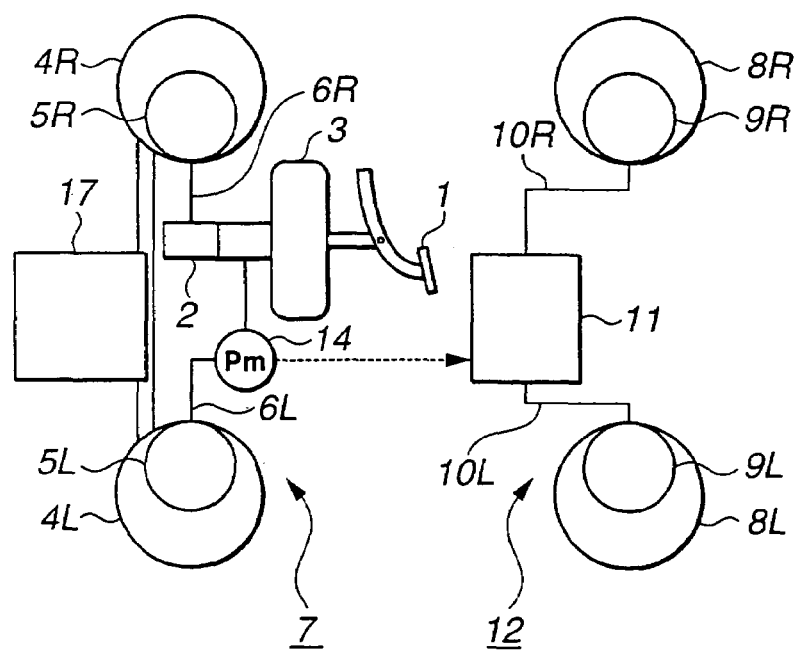
FIG. 8 is a schematic system view showing a modification of the third embodiment.

In case that regenerative brake apparatus 11 is adapted to rear wheels 8L and 8R, the braking force distribution is preferably set so as to prevent the braking force from being excessively applied to front wheels 4L and 4R. However, it is of course that regenerative brake apparatus 17 is adapted to front wheels 4L and 4R as shown in FIG. 8. In case that regenerative brake apparatus 11 is installed in the brake system as shown in FIGS. 7 and 8, the energy recovery utilizing the regenerative braking improves an effective use of energy.

Figure 9:
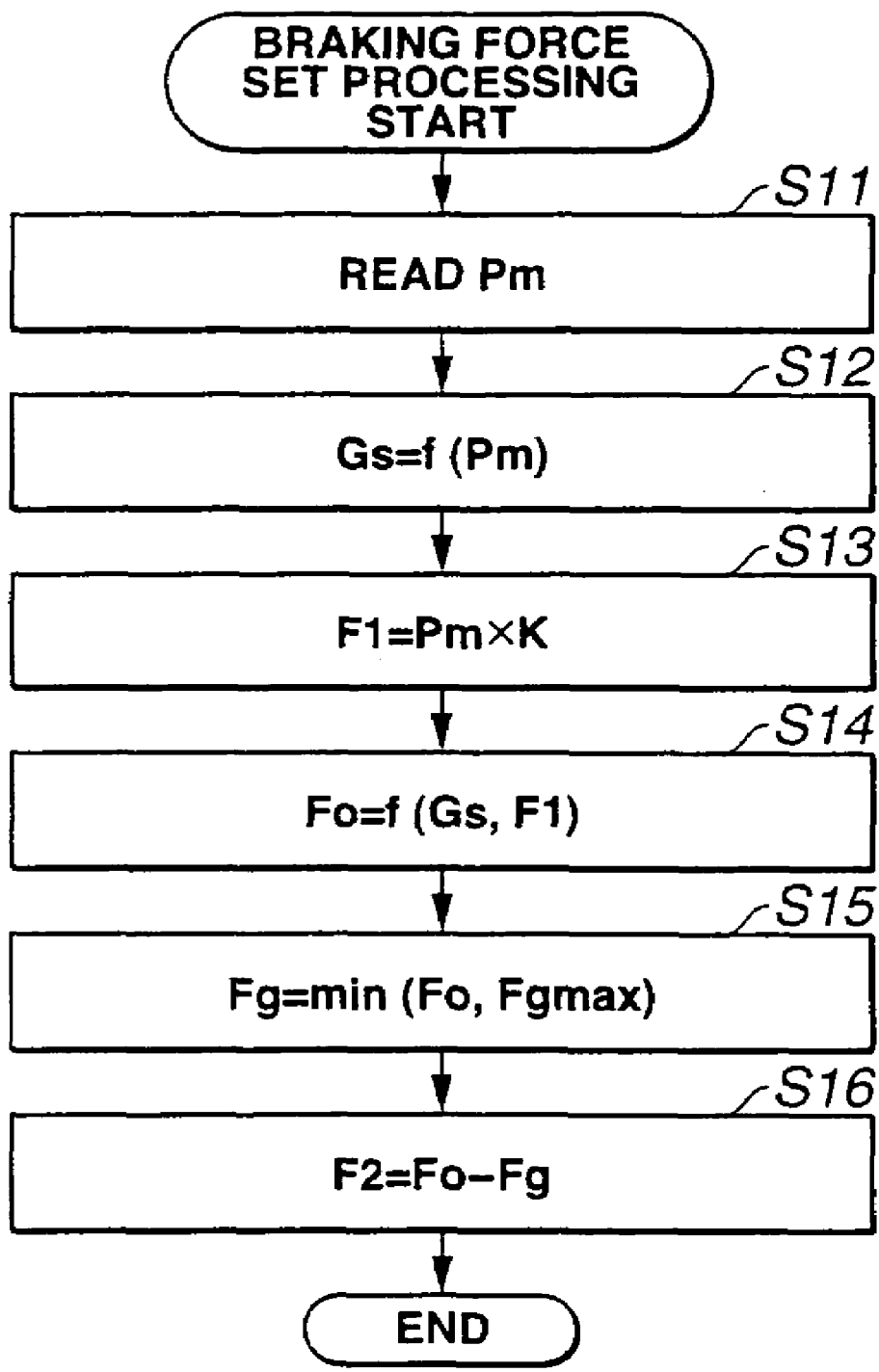
FIG. 9 is a flowchart showing a braking force set processing applicable to the brake system shown in FIGS. 7 and 8.

The target braking force of second brake system 12 and the regenerative braking force of regenerative brake apparatus 17 are determined, for example, by executing a control program shown in FIG. 9.

At step S11 a braking state of first brake system 7 is detected. More specifically, master cylinder hydraulic pressure Pm detected by sensor 14 shown in FIGS. 7 and 8 is read as the braking state of first brake system 7.

Figure 13:
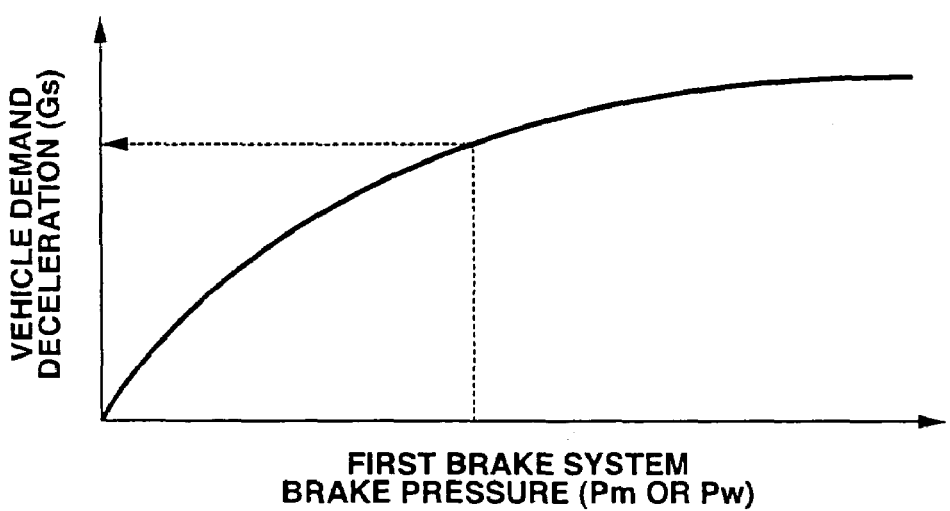
FIG. 13 is a graph showing a relationship between a front wheel braking pressure and a vehicle demand deceleration.

At step S12 corresponding to demand deceleration calculating means, a demand deceleration Gs of the vehicle is obtained on the basis of a table showing a relationship between a braking pressure of first brake system 7 (front wheels 4L and 4R) shown in FIG. 13, that is, obtained from a relationship between master cylinder hydraulic pressure Pm and the demand deceleration Gs, with reference to master cylinder hydraulic pressure Pm.

At step S13 corresponding to first braking force calculating means, braking force F1 (front wheel braking force in FIGS. 7 and 8) of first brake system 7 is obtained using master cylinder hydraulic pressure Pm and a hydraulic pressure/braking force conversion coefficient K. More specifically, braking force F1 is obtained by multiplying master cylinder hydraulic pressure Pm and a hydraulic pressure/braking force conversion coefficient K (F1=Pm×K).

Figure 14:
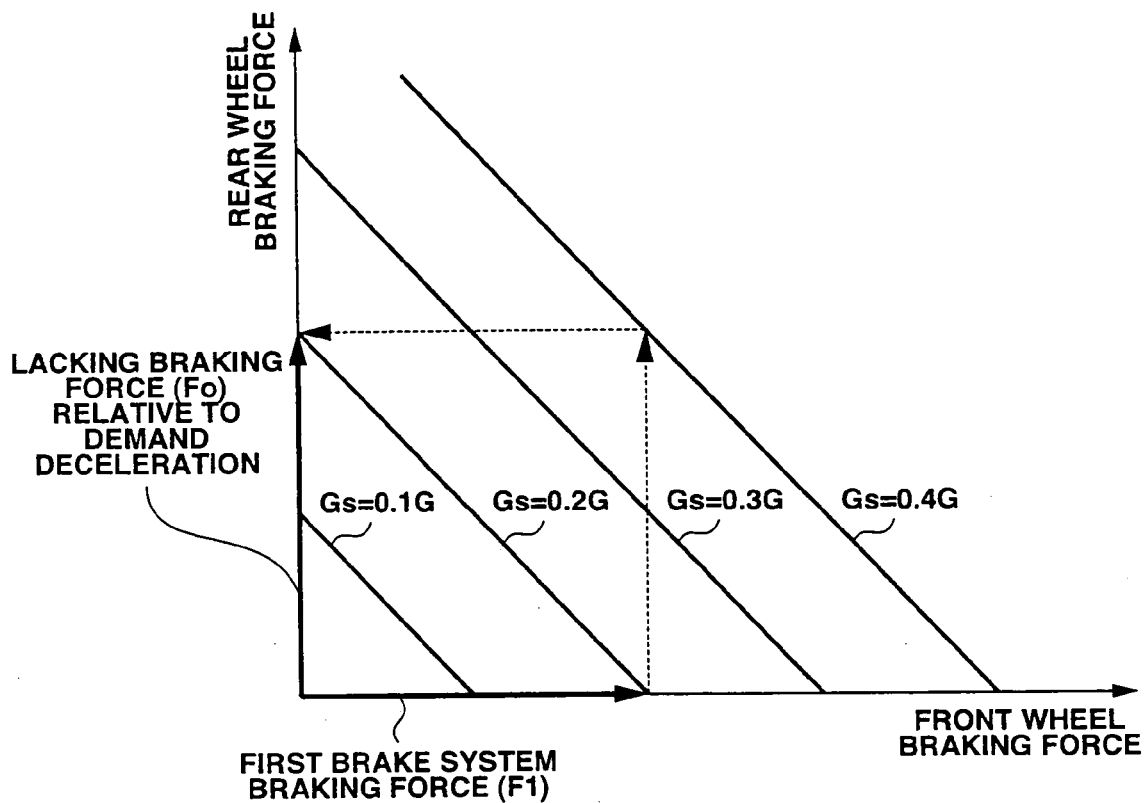
FIG. 14 is a diagram showing a combination between a front wheel braking force and a rear wheel braking force by which a vehicle demand deceleration is achieved.

At step S14, a braking force lacking quantity Fo relative to demand deceleration Gs is obtained from a function f(Gs, F1) which derives braking force lacking quantity Fo from demand deceleration Gs and braking force F1 of first brake system 7. More specifically, on the basis of a map which shows a combination of achievable front and rear wheel braking forces by each demand deceleration Gs as shown in FIG. 14, the braking force lacking quantity Fo relative to demand deceleration Gs is obtained. For example, when Gs=0.4 and F1=0.2, Fo=0.2 is derived from this map shown in FIG. 14. Since demand deceleration Gs of the vehicle is not achieved only by first braking force F1, Fo represents a lacking quantity of first braking force F1 relative to demand deceleration Gs.

At step S15 corresponding to regenerative braking force calculating means, a regenerative braking force Fg generated by a regenerative brake apparatus 17 is determined from braking force lacking quantity Fo and an allowable maximum regenerative braking force Fgmax of regenerative brake apparatus 17. More specifically, the vehicle brake system employing a regenerative brake system in addition to the mechanical brake system is basically designed so as to consume an allowable maximum regenerative braking force Fgmax of regenerative brake apparatus 17 in view of improving an energy recovery efficiency using a regenerative brake. However, if regenerative braking force Fg of regenerative brake apparatus 17 becomes greater than braking force lacking quantity Fo, the actual deceleration becomes greater than demand deceleration Gs. Accordingly, smaller one min(Fo, Fgmax) of braking force lacking quantity Fo and allowable maximum regenerative braking force Fgmax is determined as regenerative braking force Fg of regenerative brake apparatus 17. The determined regenerative braking force Fg is inputted to regenerative brake apparatus 17 as a command.

At step S16 corresponding to second braking force calculating means, target braking force F2 of second brake system 12 is obtained by subtracting regenerative braking force Fg from braking force lacking quantity Fo (F2=Fo−Fg).

With the thus arranged braking force control using second brake system 12 (target braking force F2) and regenerative brake apparatus 17 (regenerative braking force Fg), target braking force F2 of second brake system 12 and regenerative braking force Fg of regenerative brake apparatus 17 are determined so that demand deceleration Gs is achieved in coordination with braking force F1 of first brake system 7, on the basis of braking force F1 of first brake system 7 and demand deceleration Gs of the vehicle, which are obtained from the baking state (brake pedal stroke S) of first brake system 7. Accordingly, it becomes possible to reliably achieve demand deceleration Gs by first brake system braking force F1, second brake system braking force F2 and generative braking force Fg. That is, it becomes possible to realize demand deceleration Gs while executing energy recovery using regenerative braking.

Further, since first brake system braking force F1 is determined according to the brake pedal manipulation by the driver, it is not necessary to execute a calculation for obtaining this braking force F1. That is, only the calculation of target braking force F2 of second brake system 12 and regenerative braking force Fg of regenerative brake apparatus 17 are executed, and therefore the calculation load of the brake system is decreased. It will be understood that the control executed at steps S15 and S16 in FIG. 9 for setting regenerative braking force Fg at 0 (Fg=0) corresponds to the control executed by a brake system with no regenerative brake apparatus such as shown in FIGS. 1 through 5.

Figure 10:
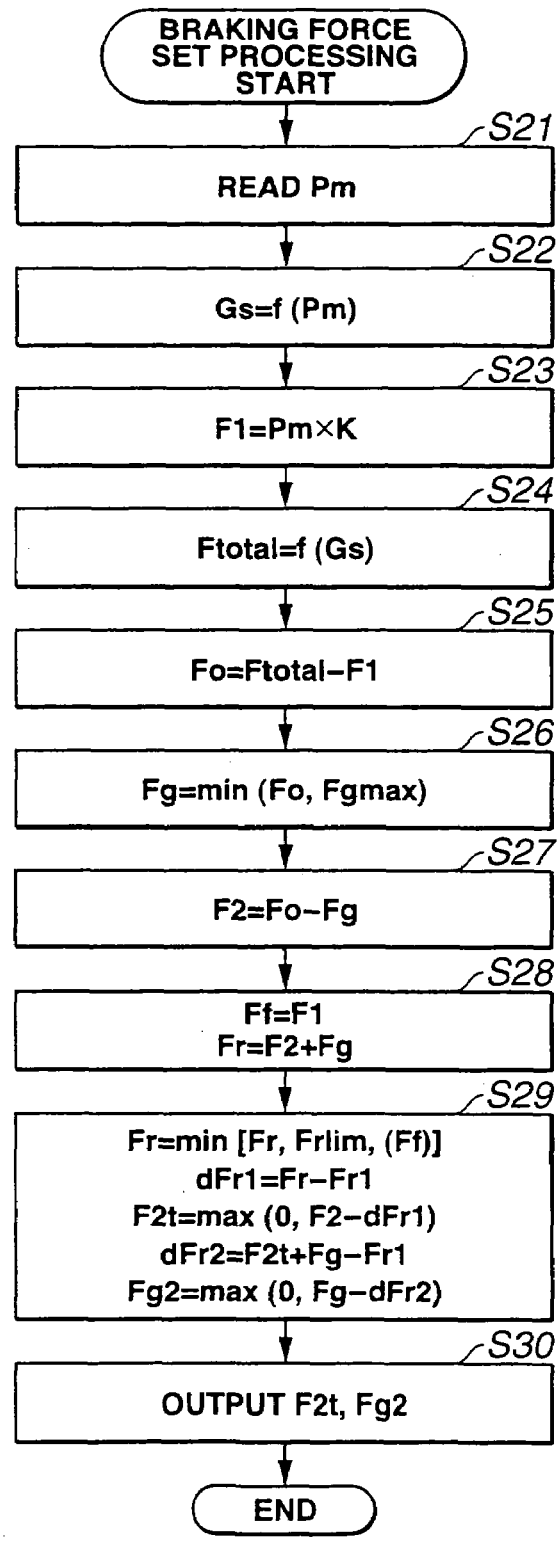
FIG. 10 is a flowchart showing another braking force set processing applicable to the brake system shown in FIG. 7.

FIG. 10 shows another control program for obtaining controlled variables of second brake system 12 and regenerative brake system 17 as to a case in that a brake system of comprising regenerative brake apparatus 17 in relation with rear wheels 8L and 8R as shown in FIG. 7 is treated as a controlled object.

Steps S21 through S23 in FIG. 10 are similar to steps S11 through S13 in FIG. 8. That is, at step S21 the braking state (master cylinder pressure Pm) of first brake system 7 is read. At step S22 demand deceleration Gs of the vehicle is obtained. At step S23 braking force F1 (front wheel braking force) of first brake system 7 is calculated.

Figure 15:
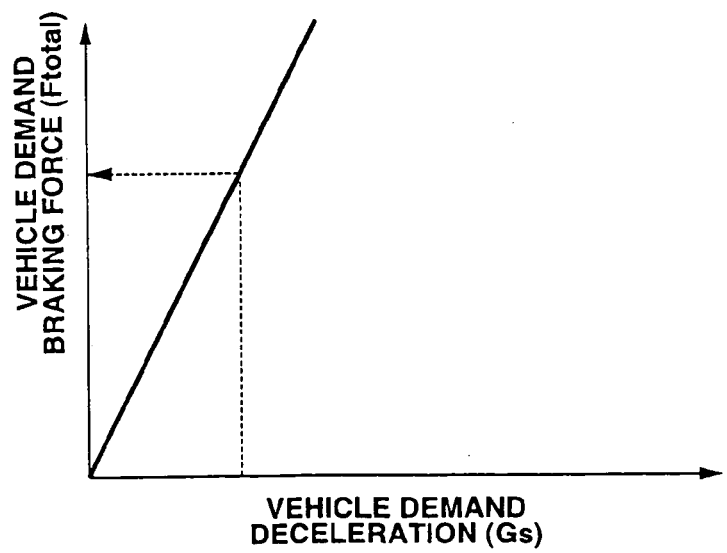
FIG. 15 is a graph showing a relationship between the vehicle demand deceleration and a vehicle demand braking force.

At step S24 demand braking force Ftotal, which is a braking force for achieving demand deceleration Gs and is represented by a function f(Gs) using demand deceleration Gs, is obtained. This demand braking force Ftotal is preferably obtained from a table shown in FIG. 15, which has been previously obtained by each vehicle, according to demand deceleration Gs.

At step S25, braking force lacking quantity Fo relative to demand braking force Ftotal is obtained by subtracting first brake system braking force F1 from demand braking force Ftotal (Fo=Ftotal−F1).

At step S26, as is similar to step S15 in FIG. 9, smaller one min(Fo, Fgmax) of braking force lacking quantity Fo and allowable maximum regenerative braking force Fgmax is determined as regenerative braking force Fg of regenerative brake apparatus 17.

At step S27, as is similar to step S16 in FIG. 9, target braking force F2 of second brake system 12 is obtained by subtracting regenerative braking force Fg from braking force lacking quantity Fo (F2=Fo−Fg).

At step S28 front axle braking force Ff and rear axle braking force Fr are calculated. More specifically, first braking force F1 is directly set as front axle braking force Ff, a sum of second braking force F2 and regenerative braking force Fg is set as rear axle braking force Fr for the reasons of the construction of the brake system shown in FIG. 7.

At step S29 corresponding to second braking force correcting means and regenerative braking force correcting means, rear axle braking force Fr is limited so as to prevent the vehicle from being put in an unstable state due to brake lock of rear wheels prior to that of front wheels.

Figure 16:
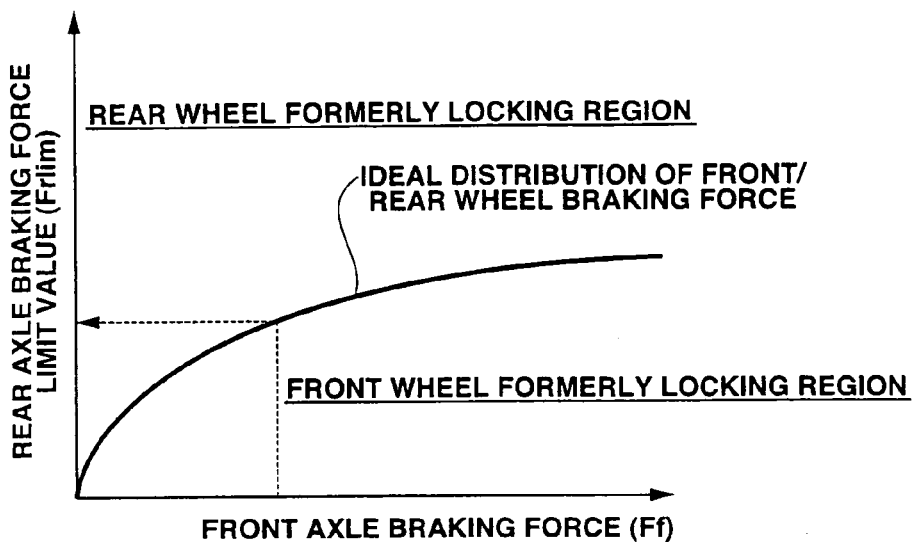
FIG. 16 is a graph showing an ideal front and rear braking force distribution for simultaneously locking front and rear wheels, which is employed in the flowchart in FIG. 11.

FIG. 16 shows an example of front and rear axle ideal braking force distribution characteristic by which font and rear wheels are simultaneously lock during the braking. An upper region above the characteristic line is a rear prior locking region wherein rear wheels is locked due to the excessive rear axle braking force Fr prior to the locking of front wheels. Further, a lower region below the characteristic line is a front priority locking region wherein front wheels is locked due to the excessive front axle braking force Ff prior to the locking of rear wheels. Accordingly, by setting the front and rear axle braking force distribution in the lower region below the ideal characteristic line in FIG. 16, it becomes possible to stabilize the vehicle behavior during the braking.

In order to limit rear axle braking force Fr, a rear axle braking force limit value Frlim is obtained from the front and rear axle braking force ideal distribution characteristic line in FIG. 16 with reference to front axle braking force Fr. Thereafter, smaller one min{Fr, Flim (Fr)} of rear axle braking force limit value Frlim and rear braking force Fr is determined as a limited rear axle braking force Fr1.

Further, by subtracting limited rear axle braking force Fr1 from rear axle braking force Fr, a rear axle braking force excessive quantity dFr1 is obtained (dFr1=Fr−Fr1). By subtracting rear axle braking force excessive quantity dFr1 from second braking force F2, a corrected target braking force F2t of second brake system 12 is obtained (F2t=F2−dFr1). In order to solve an improper control due to a condition that corrected target braking force F2t takes a negative value, larger one max(0, F2−dFr1) of zero and a value (F2−dFr1) is determined as corrected target braking force F2t.

Subsequently, by subtracting limited rear axle braking force Fr1 from the sum of correcting target braking force F2t and regenerative braking force Fg, a post-correction rear axle braking force excessive quantity dFr2 is obtained (dFr2=(F2t+Fg)−Fr1). Further, by subtracting rear axle braking force excessive quantity dFr2 form regenerative braking force Fg, corrected regenerative braking force Fg2 is obtained (Fg2=Fg−dFr2). In order to solve an improper control due to a condition that corrected regenerative braking force Fg2 takes a negative value, larger one max(0, Fg−dFr2) of zero and the value (Fg−dFr2) is determined as corrected regenerative braking force Fg2.

At step S30, corrected target braking force F2t and corrected regenerative braking force Fg2 are sent to rear wheel braking force control apparatus 11 and regenerative brake apparatus 17, respectively.

With the thus arranged braking force control using a correcting target braking force F2t for second brake system 12 and correcting regenerative braking force Fg2 for regenerative brake apparatus 17, since these corrected target braking force F2t and corrected regenerative braking force Fg2 are properly distributed as front and rear axle braking forces Ff and Fr so as not to generate the rear wheel lock prior to the front wheel lock, the vehicle behavior is kept stable.

Since this control of the brake system according to the present invention is also arranged such that braking force F1 of first brake system 7 is determined according to the brake pedal manipulation by the driver, it is not necessary to execute a calculation for obtaining this braking force F1. That is, only the calculation of target braking force F2 of second brake system 12 and regenerative braking force Fg of regenerative brake apparatus 17 are executed, and therefore the calculation load of the brake system is decreased.

Figure 11:
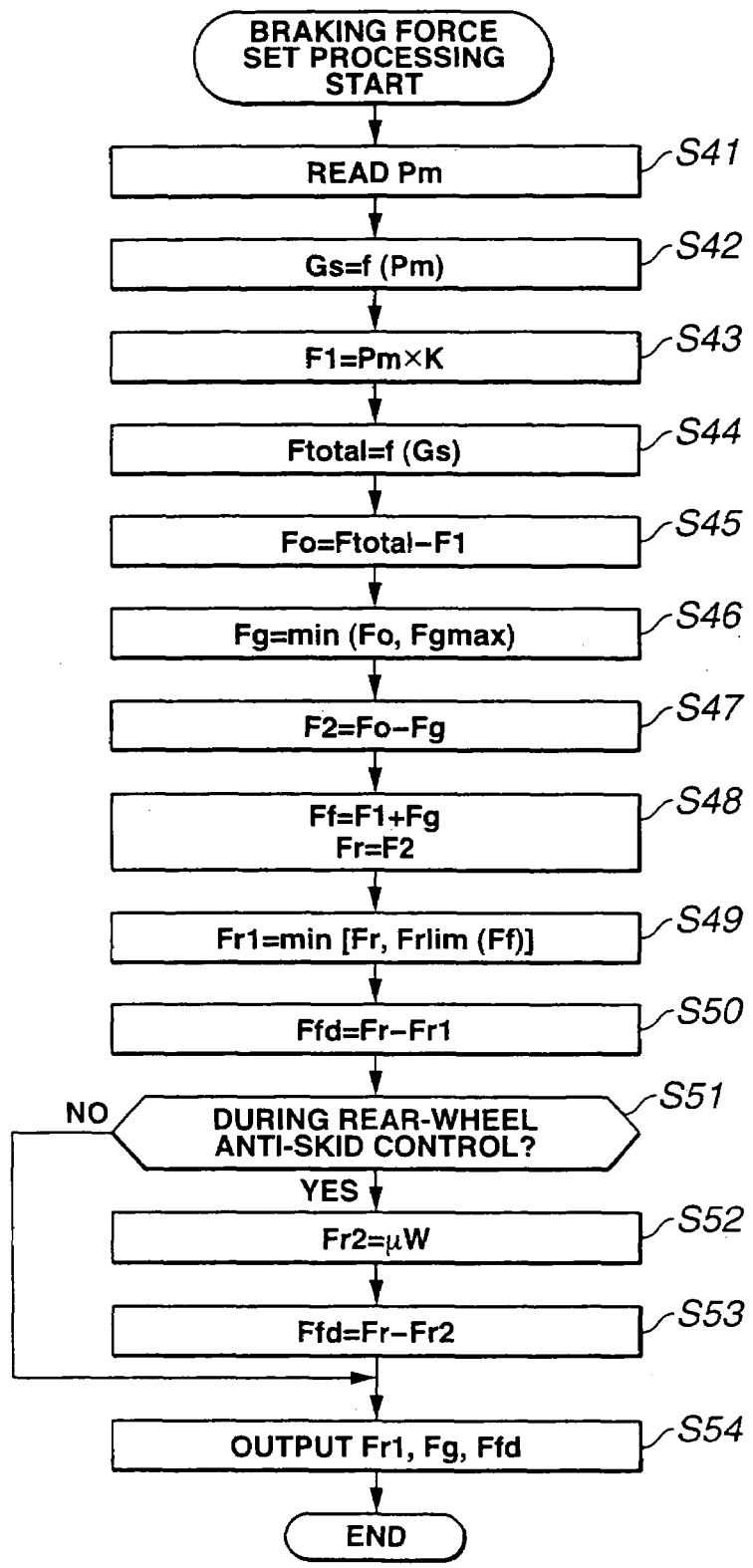
FIG. 11 is a flowchart showing another braking force set processing applicable to the brake system shown in FIG. 8.
Figure 12:
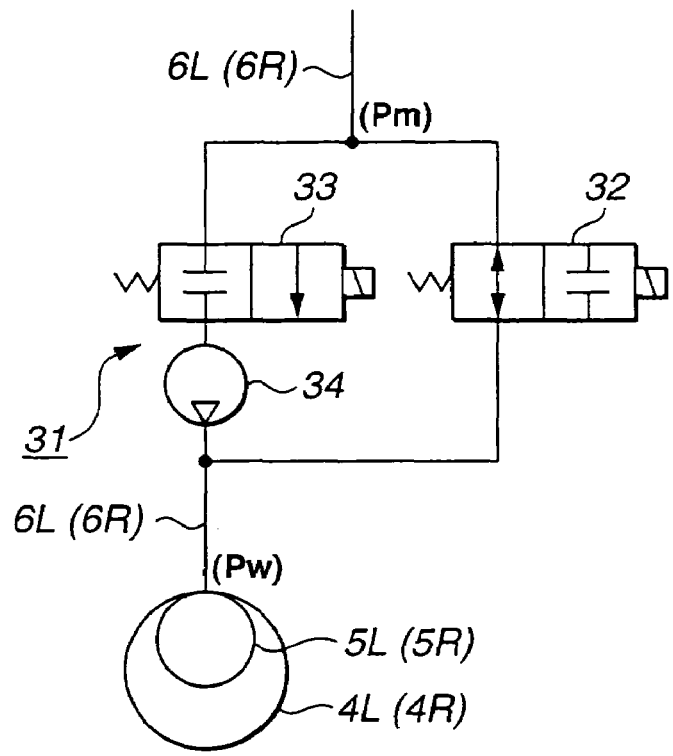
FIG. 12 is a schematic view showing a front axle braking force increasing means applied to the brake system shown in FIG. 8.

FIG. 11 shows another control program for obtaining controlled variables of second brake system 12 and regenerative brake system 17 as to a case in that a brake system of comprising regenerative brake apparatus 17 in relation with rear wheels 8L and 8R as shown in FIG. 8 and of additionally comprising front axle braking force increasing means 31 respectively attached to front brake conduits 6L and 6R as shown in FIG. 12 is treated as a controlled object.

Front axle braking force increasing means 31 shown in FIG. 12 is constructed by a normally-open solenoid valve 32, a normally-closed solenoid valve 33 and a pressure increasing pump 34. Normally-closed solenoid valve 33 and pressure increasing pump 34 are connected in series, and normally-open solenoid valve 32 is connected in parallel with these series-connection valve 32 and pump 33. This arranged unit is provided in each of front wheel brake conduits 6L and 6R of the brake system shown in FIG. 8.

Pressure increasing pump 34 is provided at a nearer position to each brake unit 5L, 5R as compared with the position of normally-closed solenoid valve 33 so that working fluid of master cylinder 2 shown in FIG. 8 is discharged to each brake unit 5L, 5R. An existing pump employed in a dynamic behavior control in the vehicle brake system may be also used as this pressure increasing pump 34.

When both of normally-open solenoid valve 32 and normally-closed solenoid valve 33 are put in off state, front axle braking force increasing means 31 is put in open state, and therefore master cylinder hydraulic pressure Pm is supplied to each brake unit 5L, 5R. Therefore, under this off state, front axle braking force is determined only by a brake manipulation of the driver.

When there is an increasing demand of increasing the front axle braking force over the brake manipulation force of the driver, normally-open solenoid valve 32 is turned ON to put the valve 32 in the closed state, and normally-closed solenoid valve 33 is also turned ON to put the valve 33 in the open state so that fluid connection between master cylinder 2 and brake unit 5L, 5R is shut off. By driving pressure increasing pump 34 according to the demand increasing quantity of the front axle braking force under this condition, braking hydraulic pressure Pw of each brake unit 5L, 5R is increased, and therefore the front axle braking force is increased by the demand increasing quantity.

The control program shown in FIG. 11 relates to the brake system which further comprises the front axle braking force increasing means 32 in the system shown in FIG. 8. Contents at steps S41 through 47 are similar to those at steps S21 through S27 in FIG. 10, as follows:

At step S41, the braking state (master cylinder hydraulic pressure Pm) of first brake system 7 is read. At step S42, demand deceleration Gs of the vehicle is obtained. At step S43, braking force F1 (front wheel braking force) of first brake system 7 is calculated. At step S44, demand braking force Ftotal (braking force for achieving demand deceleration) is obtained. At step S45, braking force lacking quantity Fo is obtained. At step S46 regenerative braking force Fg of regenerative brake apparatus 17 is determined. At step S47 target braking force F2 of second brake system 12, which is necessary to realize demand deceleration Gs in coordination with first braking force F1, is determined from a map shown in FIG. 17 and demand deceleration Gs and first braking force F1, for example, as shown by an arrow (1) in FIG. 17.

At step S48 front axle braking force Ff and rear axle braking force Fr are calculated. More specifically, a sum of first braking force F1 and regenerative braking force Fg is set as front axle braking force Fr, and second braking force F2 is directly set as rear axle braking force Fr, for the reason of the construction of the brake system shown in FIG. 8.

At step S49 corresponding to second braking force correcting means, rear axle braking force Fr is limited so as to prevent the vehicle from being put in an unstable state due to brake lock of rear wheels prior to that of front wheels, as is similar to the processing at step S29 in FIG. 10. More specifically, limited rear axle braking force Fr1 is obtained in a manner shown in FIG. 17.

At step S50 corresponding to front axle braking force increasing quantity calculating means, rear axle braking force excessive quantity is obtained by subtracting limited rear axle braking force Fr1 from rear axle braking force Fr. That is, rear axle braking force correction quantity Ffd necessary for preventing the rear wheels from locking prior to the front wheels is obtained as shown by an arrow (2) in FIG. 17.

At step S51 it is determined whether or not an anti-skid brake control system for rear wheels is operating. When the determination at step S51 is negative, that is, it is determined that the anti-skid brake control system for rear wheels is not operating, the program jumps to step S54 wherein limited rear axle braking force Fr1 is directly set as corrected target braking force of second brake system 12 in a manner shown by an arrow (3) in FIG. 3, and the determined corrected target braking force is outputted to rear wheel braking force control apparatus 11 shown in FIG. 8. Further, regenerative braking force Fg is outputted to regenerative brake apparatus 17, and front axle braking forcer demand increasing quantity Ffd is outputted to front braking force increasing means 31 shown in FIG. 12.

Figure 17:
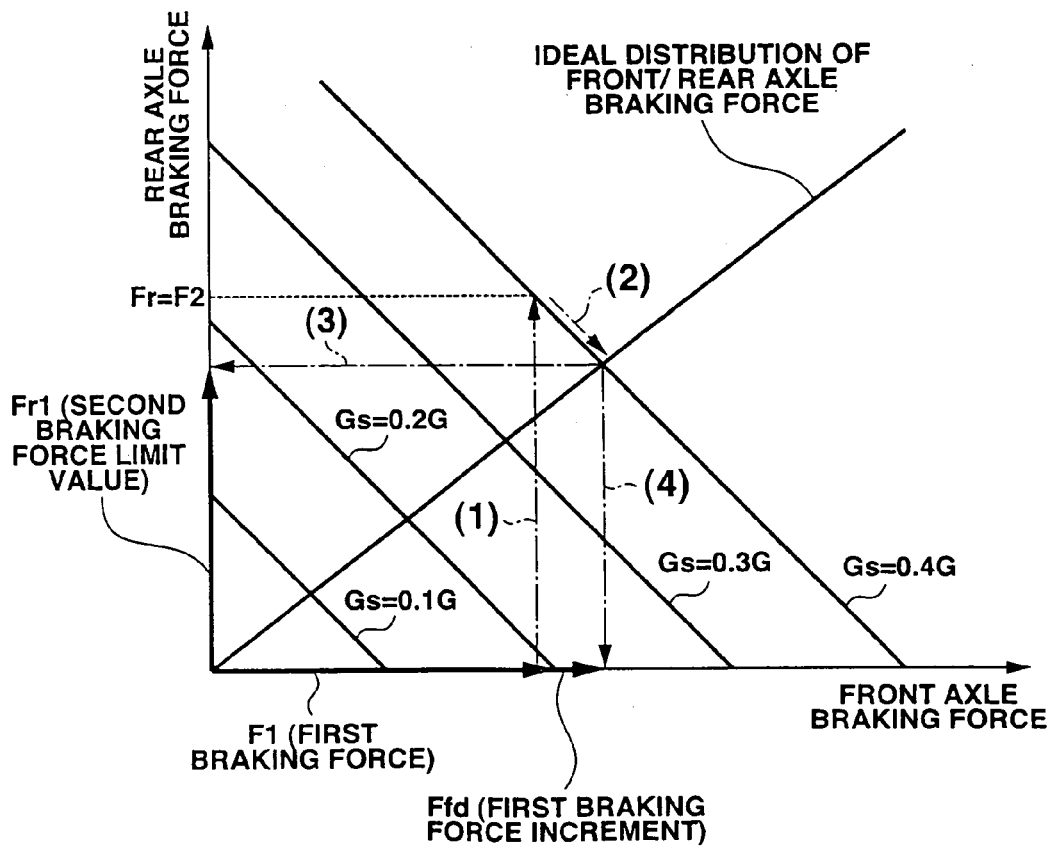
FIG. 17 is a diagram showing a combination between a front wheel braking force and a rear wheel braking force by which a vehicle demand deceleration is achieved and which is employed in the flowchart in FIG. 11.

With the thus arrangement of outputting front axle braking force demand increasing quantity Ffd to front axle braking force increasing means 31, the increasing quantity Ffd is added to first braking force F1 as shown by an arrow (4) in FIG. 17, and therefore demand deceleration Gs(0.4 G) is achieved without generating the lacking of deceleration even by executing the front and rear axle braking force distribution which does not generate a rear wheel lock prior to a front wheel lock.

With the thus arranged braking force control using second brake system 12 (corrected target braking force Fr1), regenerative brake apparatus 17 (regenerative braking force Fg) and front axle braking force increasing means (front axle braking force increasing quantity Ffd), as is apparent from the above explanation, corrected target braking force Fr1, regenerative braking force Fg and front axle braking force increasing quantity Ffd are realize a preferable front and rear axle braking force distribution without generating the rear wheel lock prior to the front wheel lock, while achieving the target deceleration Gs of the vehicle. Consequently, the brake system according to the present invention achieves the target deceleration Gs and prevents the unstable behavior of the vehicle caused by the rear wheel lock prior to the front wheel lock.

Since first braking force F1 of first brake system 7 is determined from the brake pedal manipulation by the driver, the calculation for first braking force F1 is omitted, and the calculations for corrected target braking force F2t of second brake system 12, corrected regenerative braking force Fg2 of regenerative brake apparatus 17 and front axle braking force demand increasing quantity Ffd of front axle braking force increasing means 31 are executed. This arrangement decreases the calculation load of the brake system.

When the determination at step S51 is affirmative, that is, it is determined that the anti-skid brake apparatus is operating, the program in FIG. 11 proceeds to step S52 wherein an actual braking force Fr2, which is lowering, is obtained by multiplying a road friction coefficient g and a wheel weight W (Fr2=gW). At step S53 corresponding to front axle braking force increasing quantity calculating means, front axle braking force correction quantity (demand increasing quantity) Ffd, which is necessary for preventing the rear wheel lock prior to the front wheel lock, is obtained by subtracting actual braking force Fr2 from rear axle braking force Fr (Ffd=Fr−Fr2), since front axle braking force correction quantity Ffd corresponds to a rear axle braking force excessive quantity. At step S54 the obtained front axle braking force correction quantity Ffd is outputted together with target braking force Fr1 and front axle regenerative braking force to first brake system 7 regenerative brake apparatus 11.

Accordingly, when the braking force of the left and right rear wheels is lowered under a condition the anti-skid brake system is operating, the lowered rear wheel braking force Fr2 is employed instead of front axle braking force increasing quantity Ffd obtained at step S50 to determine front axle braking force increasing quantity Ffd (Ffd=Fr−Fr2) which is employed in the braking force control. As a result, front axle braking force demand increasing quantity Ffd is increased by a rear wheel braking force deceased quantity, which is generated by the anti-skid function of the rear wheel anti-skid control apparatus. Accordingly, even when the rear wheel braking force is lowered by the operation of the rear wheel anti-skid brake apparatus, demand deceleration Fs of the vehicle is certainly achieved.

When the braking force control shown in FIG. 10 is executed upon additionally providing regenerative brake apparatus as shown in FIGS. 7 and 8, it is preferable that the brake system is arranged such that front two wheels 4L and 4R is braked by first brake system 7 of a mechanical type and rear two wheels 8L and 8R are braked by second brake system 12 of an electronic type, and that first braking force F1 generated by first brake system 7 is decreased by the braking force of second brake system 12.

With the thus arranged brake system according to the present invention, in connection with the front and rear axle braking force distribution which is necessary for achieving the rear wheel prior lock prevention, the regenerative braking force by regenerative brake apparatus 11 is increased. This operation increases the energy recovery quantity and thereby improving the energy efficiency of the vehicle.

Figure 18:
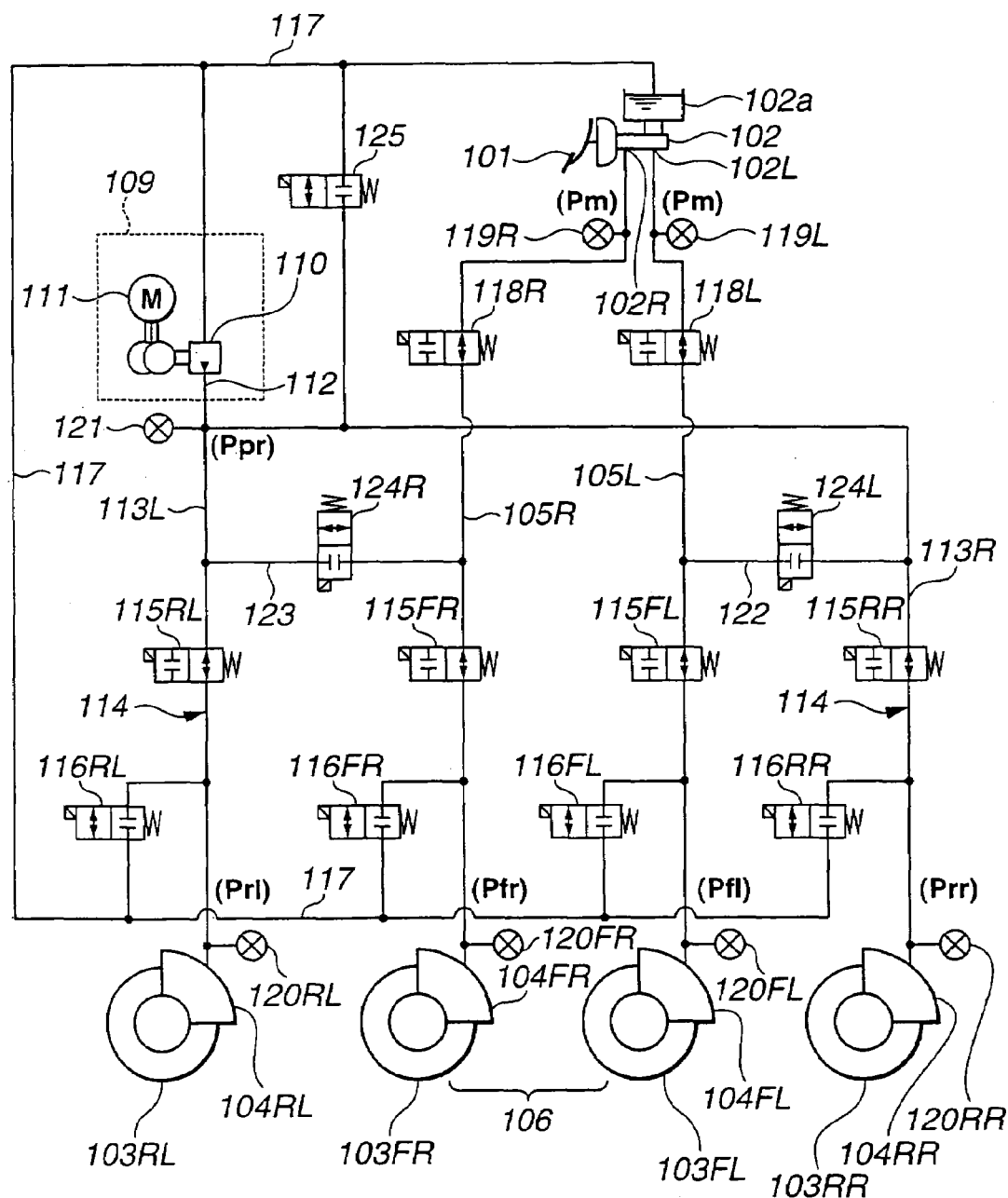
FIG. 18 is a view showing a fourth embodiment of the brake system according to the present invention.

Referring to FIG. 18, there is discussed a fourth embodiment of the brake system according to the present invention.

As shown in FIG. 18, a brake pedal 101 applies a brake manipulation force generated by the depressing operation of the driver to a master cylinder 102. The brake manipulation force of brake pedal 101 is inputted to master cylinder 2 through a booster which may be of a negative pressure type, positive pressure type or hydraulic pressure type.

Master cylinder 102 in this embodiment is a tandem master cylinder and outputs master cylinder hydraulic pressure Pm corresponding to the brake manipulation force using working fluid of reservoir 102a from two hydraulic pressure outlets 102L and 102R when an inner piston cup of master cylinder 102 is depressed by the brake manipulation force.

Two brake conduits 105L and 105R extend from two hydraulic pressure outlets 102L and 102R to brake units (including brake drums or disc brake units) 104FL and 104FR of left and right front wheels 103FL and 103FR, respectively. These two independent brake circuits construct mechanical first brake system 106 for front wheels.

A pressure source 109 different from master cylinder 102 is attached to brake units 104RL and 104RR of left and right rear wheels 103RL and 103RR. This pressure source 109 is constructed by a pump 110 and a motor 111.

Pump 110 driven by motor 111 may be a plunger pump or gear pump, and is arranged to suck the working fluid in reservoir 102a and to discharge the fluid to a pump outlet circuit 112 so that left and right rear wheels 3RL and 3RR are braked by the pump hydraulic pressure Ppr. Accordingly, pump outlet circuit 112 is connected to brake units 104RL and 104RR for left and right rear wheels 3RL and 3RR. These two independent brake circuits construct second brake system 114.

Hereinafter, there are discussed first brake system 106 for front wheels and second brake system 114 for rear wheels.

First pressure increasing valves 115FL and 115FR and first pressure decreasing valves 116FL and 116FR are disposed in left and right front wheel brake conduits 105L and 105R of first brake system 106, respectively, so that the brake system is capable of independently controlling brake hydraulic pressures Pfl and Pfr of left and right front wheels. Each of first pressure increasing valves 115FL and 115FR is a normally-open solenoid valve and provided in each of brake conduits 105L and 105R so that an opening of each pressure increasing valve 115FL, 115FR is decreased according to the increase of electromagnetic force in each valve 115FL, 115FR so as to decrease a degree of opening of each brake conduit 105L, 105R.

Each of first pressure decreasing valves 116FL and 116FR is a normally-closed solenoid valve which increases its opening according to the increase of electromagnetic force. These first pressure decreasing valves 116FL and 116FR are disposed between a drain passage 117 connected to reservoir 102a and brake conduits located between first pressure increasing valves 115FL, 115FR and brake unit 104FL, 104FR, respectively.

Master cut valves 118L and 118R are disposed in brake conduits 105L and 105R located between first pressure increasing valves 115FL and 115FR and master cylinder 102, respectively. Each master cut valve 118L, 118R is of a normally-open solenoid valve. During when left and right front wheel brake hydraulic pressures Pfl and Pfr are independently controlled by first pressure increasing valves 115FL and 115FR and first pressure decreasing valves 116FL and 116FR, respectively, In order to raise left and right front wheel brake hydraulic pressure Pfl and Pfr to pressures higher than master cylinder hydraulic pressure Pm, master cut valves 118L and 118R are turned ON to shut off (close) conduits 105L and 105R, respectively.

In order to control left and right front wheel brake hydraulic pressures Pfl and Pfr to pressures lower than master cylinder hydraulic pressure Pm, the opening state of conduits 105L and 105R is not limited and therefore master cut valves 118L and 118R may be energized or de-energized.

Pressure sensors 119L and 119R are connected to brake conduits 105L and 105R located between master cut valves 118L and 118R and master cylinder 102, respectively and detect master cylinder pressures Pm, respectively. Pressure sensors 120FL and 120FR are connected to brake conduits 105L and 105R located between pressure increasing valves 115FL and 115FR and brake units 104FL and 104FR, respectively and detect left and right front wheel brake hydraulic pressures Pfl and Pfr, respectively.

Subsequently, there is discussed second brake system 114 for rear wheels. Second pressure increasing valves 115RL and 115RR and second pressure decreasing valves 116RL and 116RR are disposed in left and right rear wheel brake conduits 113L and 113R of second brake system 114, respectively, so that second brake system 114 is capable of independently controlling brake hydraulic pressures Prl and Prr of left and right rear wheels according to the detection result of the braking state of first brake system 106. Each of second pressure increasing valves 115RL and 115RR is a normally-open solenoid valve and provided in each of brake conduits 113L and 113R so that an opening of each second pressure increasing valve 115RL, 115RR is decreased according to the increase of electromagnetic force in each valve 115FL, 115FR so as to decrease a degree of opening of each brake conduit 105L, 105R.

Each of second pressure decreasing valves 116RL and 116RR is a normally-closed solenoid valve which increases its opening according to the increase of electromagnetic force. These second pressure decreasing valves 116RL and 116RR are disposed between a drain passage 117 connected to reservoir 102a and brake conduits located between second pressure increasing valves 115RL, 115RR and brake unit 104RL, 104RR, respectively.

A pressure sensor 121 is attached to a pump discharge circuit 112 or brake conduit 113L or 113R branched from the circuit 112, and detects a pump discharge pressure Ppr discharged from pressure source 109. Further, pressure sensors 120RL and 120RR are attached to brake conduits 113L and 113R located between second pressure increasing valves 115RL and 115RR and brake units 104RL and 104RR, respectively, and detect left and right rear wheel brake hydraulic pressures Prl and Prr, respectively.

A passage 122 connects brake conduit 105L which connects first pressure increasing valve 115FL and master cut valve 118L and brake conduit 113R which connects second pressure increasing valve 115RR and pump discharge circuit 112. A passage 123 connects brake conduit 105R which connects first pressure increasing valve 115FR and master cut valve 118R, and brake conduit 113L which connects first pressure increasing valve 115RL and pump discharge circuit 112. Pressure source selector valves 124L and 124R for first brake system 6 are disposed in passages 122 and 123, respectively.

Pressure source selector valves 124L and 124R are of a normally-open valve which is closed when energized. During when left and right front wheel brake hydraulic pressure Pfl and Pfr are independently controlled through the control of first pressure increasing valves 115FL and 115FR and first pressure decreasing valves 116FL and 116FR, pressure source selector valves 124L and 124R are de-energized to be put in the open state.

A solenoid pressure control valve 125 is disposed between rear wheel brake conduit 113RL (or brake conduit 113R or pump discharge circuit 112) and a drain circuit 117. Solenoid pressure control valve 125 decreases a discharge pressure Ppr of pump 110 by increasing its opening in proportion to the applied electromagnetic force. Herein, discharge pressure (output pressure of pressure source 9) Ppr is controlled at master cylinder hydraulic pressure Pm except when it is necessary to control rear wheel brake hydraulic pressure Prl and Prr at a pressure higher than master cylinder hydraulic pressure Pm. Only when it is necessary to control rear wheel brake hydraulic pressure Prl and Prr at a pressure higher than master cylinder hydraulic pressure, discharge pressure Ppr is controlled at a pressure higher than master cylinder hydraulic pressure Pm. In order to achieve the above control of solenoid pressure control valve 25, the opening of pressure control solenoid valve 25 is electronically controlled while executing a feedback control of a detected value of discharge pressure Ppr.

Subsequently, there is discussed the function of this embodiment of the brake system according to the present invention. When brake pedal 101 is depressed by the driver to brake (decelerate) the vehicle, front wheel brake hydraulic pressures Pfl and Pfr is obtained by changing master cylinder pressure Pm through master cut valves 118L and 118R in open state and pressure increasing valves 115FL and 115FR change master cylinder pressure Pm, and is applied to brake units 104FL and 104FR to brake left and right front wheels 103FL and 103FR. During this period, brake units 104RL and 104RR of left and right rear wheels 103RL and 103RR receive rear wheel brake hydraulic pressures Prl and Prr which are obtained by changing pump discharge pressure Ppr discharged from pressure source 109 through conduits 113L and 113R and second pressure increasing valves 115RL and 115RR in an open state so as to brake left and right rear wheels 103RL and 103RR.

When left and right rear wheel brake hydraulic pressures Prl and Prr are controlled, the detection values of left and right rear wheel brake hydraulic pressures Prl and Prr are controlled by controlling the openings of second pressure increasing valves 115RL and 115RR and second pressure decreasing valves 116RL and 116RR so as to be brought closer to the target value determined according to the detection result (such as master cylinder hydraulic pressure Pm or brake pedal manipulated quantity) of at least the front wheel brake state of first brake system 106. This pressure control is applicable to the electronic braking force distribution system (EBD), the anti-skid brake system (ABS), the traction control system (TCS) and the vehicle dynamics control (VDC).

Similarly, when left and right front brake hydraulic pressures Pfl and Pfr are controlled, the detection values of left and right front wheel brake hydraulic pressure Pfl and Pfr are respectively controlled by controlling the openings of first pressure increasing valves 115FL and 115FR and first pressure decreasing valves 116FL and 116FR, respectively. This control is also applicable to the electronic braking force distribution system (EBD), the anti-skid brake system (ABS), the traction control system (TCS) and the vehicle dynamics control (VDC).

During the control of left and right front wheel hydraulic pressures Pfl and Pfr, when front wheel hydraulic pressures Pfl and Pfr are raised to pressures higher than master cylinder hydraulic pressure Pm, master cut valves 118L and 118R are put in closed state, and pressure source selector valves 124L and 124R are put in open state. When front wheel hydraulic pressures Pfl and Pfr are controlled at pressures lower than master cylinder hydraulic pressure Pm, pressure source selector valves 124L and 124R are put in open state, and master cut valves 118L and 118R may be opened or closed.

With the thus arrangement of the brake system according to the present invention, even when it is necessary that front wheel brake hydraulic pressures (Pfl and Pfr) are controlled to be higher than master cylinder hydraulic pressure Pm, the pressure source for left and right front wheel brake hydraulic pressure control is switched from master cylinder 102 to pressure source 109 for the rear wheels. Therefore, it is not necessary to provide a different pressure source of front wheel brake hydraulic pressure control. This solves problems as to space and cost of the different pressure source.

Further, during this control for raising front wheel brake hydraulic pressures (Pfl and Pfr) at pressures higher than master cylinder hydraulic pressure Pm, mater cut valves 118L and 118R are put in closed state. This arrangement solves a problem that a stroke of brake pedal 101 is changed during the control of front wheel brake hydraulic pressure.

When front wheel brake hydraulic pressures Pfl and Pfr are controlled to be lower than master cylinder hydraulic pressure Pm, master cut valves 118L and 118R may be closed or opened in view of the control. However, if master cut valves 118L and 118R are closed, the hydraulic pressure control state is not feedbacked to brake pedal 101 through the stroke change of brake pedal 101 is avoided during the front wheel brake hydraulic pressure control.

In reverse, if master cut valves 118L and 118R are opened, the hydraulic pressure control state is feedbacked to brake pedal 101 although the stroke change of brake pedal 101 is generated during the front wheel brake hydraulic pressure control.

Further, when the electronic control of left and right rear wheel brake hydraulic pressures Prl and Prr is executed, the electronic control is executed on the basis of at least detection result of the mechanical braking state of first (front) wheel brake system 106. Therefore, it is possible to detecting the mechanical braking state of first (front) wheel brake system 106 while ensuring the normal feeling in the brake pedal manipulation, even if a stroke simulator is not installed in the brake system. Consequently, this brake system enables the electronic control of the rear wheel brake hydraulic pressure while suppressing the number of parts of the brake system. This is very advantageous in production cost.

In case that pomp pressure Ppr is controlled at a pressure lower than master cylinder hydraulic pressure Pm generated by the brake pedal manipulation to control front wheel brake hydraulic pressure (Pfl, Pfr), master cut valves 118L and 118R may not be employed. That is, master cylinder 102 and pressure source 109 are simultaneously used. Throughout the explanation of the brake system according to the present invention, meaning of "using in both" includes "combined use" and is not limited to a switch of pressure source 109.

Although the embodiment shown in FIG. 18 has been shown and described such that a brake system for left and right front wheels 103FL and 103FR is constructed by first brake system 106 which mechanically responds to master cylinder pressure Pm, and that a brake system for left and right rear wheels 103RL and 103RR is constructed by second brake system 114 of an electronic control type which responds to the detection result of at least first brake system 106, these relationship may be inversely utilized.

Figure 19:
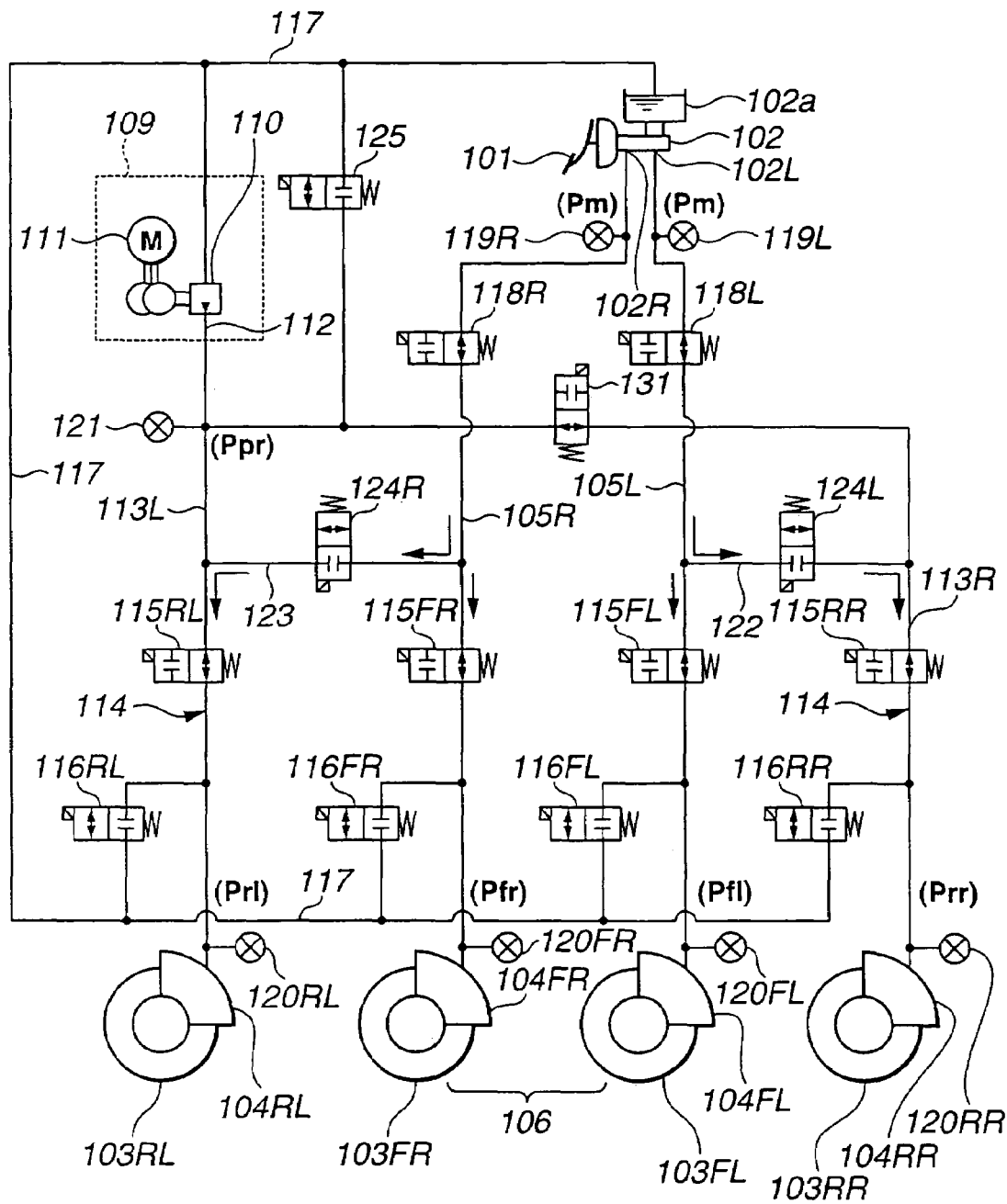
FIG. 19 is a view showing a fifth embodiment of the brake system according to the present invention.

Further, the brake system according to the present invention may be arranged such that a brake system for left front and right rear wheels 103FL and 103RR is constructed by first brake system 106 which mechanically responds to master cylinder pressure Pm, and that a brake system for right front and left rear wheels 103FR and 103RL is constructed by second brake system 114 of an electronic control type Referring to FIG. 19, there is discussed a fifth embodiment of the brake system according to the present invention. This embodiment is generally the same as the previous embodiment shown in FIG. 18, except that a fail-safe valve 131 is provided in a passage connecting rear wheel brake conduits 113L and 113R of second brake system 114. More specifically, in FIG. 19, the provided position is a part of the conduit between right rear wheel brake conduit 113R connected to left rear wheel brake conduit 113L and second pressure increasing valve 115RR. Herein, fail-safe valve 131 is a normally-open solenoid valve and is energized to be put in closed state when the brake system is put in a fail safe mode under which pressure source 109 becomes inoperable due to electric trouble and it becomes impossible to generate pump pressure Ppr.

Hereinafter, there is discussed the function of the brake system which comprises the above discussed fail-safe valve 131.

During a normal state wherein pressure source 109 of second brake system 114 is operable so that pump pressure Ppr is generated, fail-safe valve 131 is de-energized to be put in open state so that the brake system shown in FIG. 19 functions as same as that in FIG. 18. For example, pump pressure Ppr is supplied to left and right rear wheel brake units 104RL and 104RR through conduits 113L and 113R, respectively.

During the fail safe mode wherein pump pressure Ppr cannot be generated due to the inoperative state of pressure source 109 of second brake system 114, fail-safe valve 131 is energized to be put in closed state. This operation sets the brake system into a diagonal type brake system using master cylinder hydraulic pressure Pm so as to brake four wheels. That is, pressure source selector valves 124L and 124R is de-energized to be put in open state, and the other valves are put in the normal state as shown in FIG. 19 so that the brake system is put in a port connecting state shown in FIG. 19. Accordingly, master cylinder pressure Pm to left front wheel brake conduit 105L is supplied to brake unit 104FL of left front wheel 103FL through master cut valve 118L put in open state and first pressure increasing valve 115FL to brake left front wheel 103FL. On the other hand, master cylinder pressure Pm to left front wheel brake conduit 105L is supplied to brake unit 104RR of right rear wheel 103RR through master cut valve 118L put in open state, pressure source selector valve 124L and second pressure increasing valve 115RR to brake right rear wheel 103RR.

Further, master cylinder pressure Pm to right front wheel brake conduit 105R is supplied to brake unit 104FR of right front wheel 103FR through master cut valve 118R put in open state and first pressure increasing valve 115FR to brake right front wheel 103FR. On the other hand, master cylinder pressure Pm to right front wheel brake conduit 105R is supplied to brake unit 104RL of left rear wheel 103RL through master cut valve 118R put in open state, pressure source selector valve 124R and second pressure increasing valve 115RL to brake left rear wheel 103RL.

During this period, the hydraulic pressure passing through left rear wheel brake conduit 113L is also supplied to pump 111 of pressure source 109. However, since pump 111 is arranged such that working fluid does not return to an inlet side, the fluid in left rear wheel brake conduit 113L does not flow out from pump 111 put in the inoperative state.

With this arrangement according to the present invention, when pump pressure Ppr cannot be generated due to the inoperative state of pressure source 109 of second brake system 114, the brake system executes braking the four wheels by the function as same as the diagonal wheel brake control (left front wheel 104FL and right rear wheel 104RR are controlled by one system, and right front wheel 104FR and left rear wheel 104RL are controlled by one system).

Brake hydraulic pressures for four wheels are capable of being independently controlled by the opening control of the respective pressure increasing and decreasing valves, as far as the electric circuit for the pump system is independently set and the pressure increasing and decreasing valves are not in the fail safe mode (inoperative state).

Figure 20:
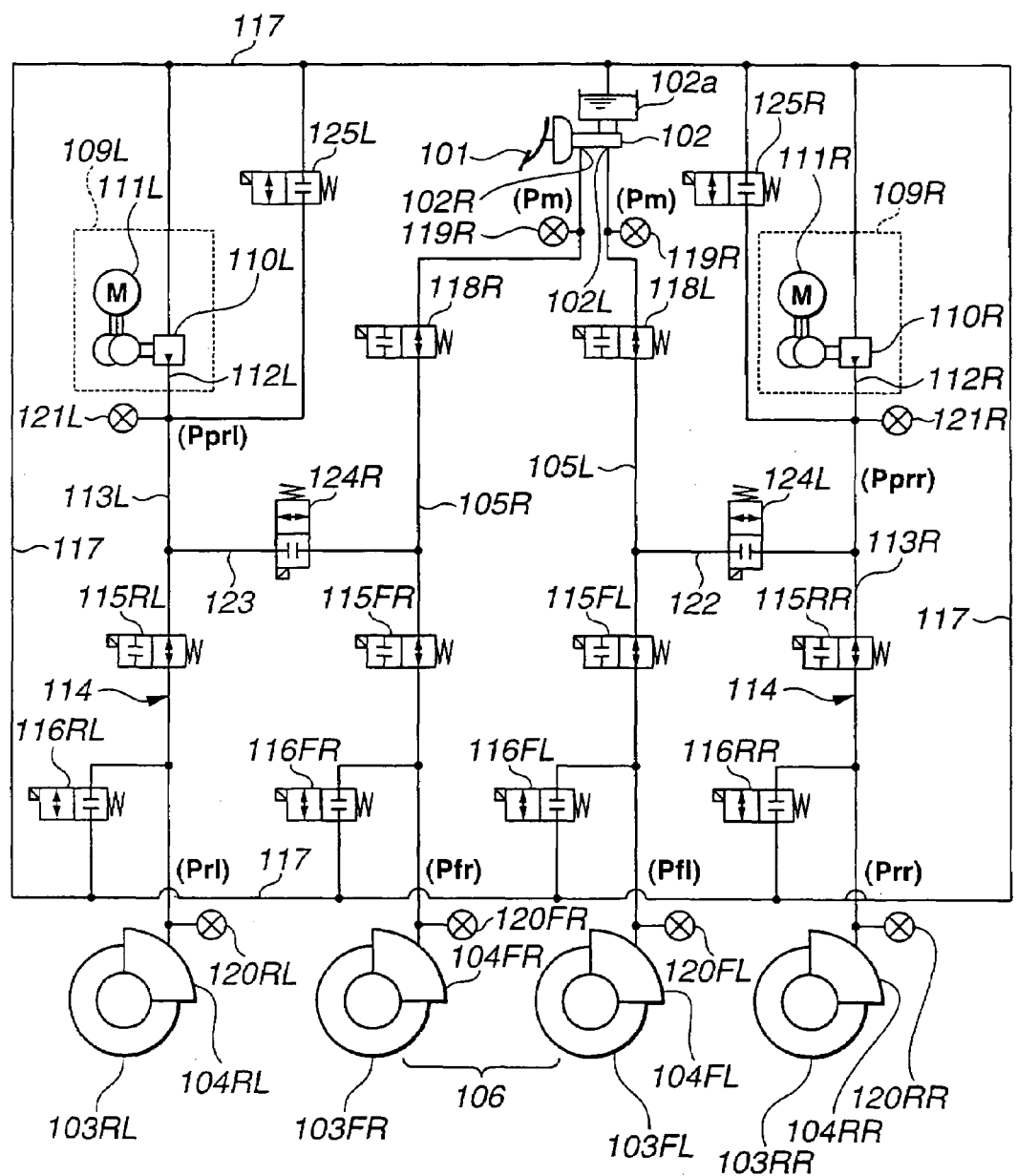
FIG. 20 is a view showing a sixth embodiment of the brake system according to the present invention.

FIG. 20 shows a sixth embodiment of the brake system according to the present invention. This embodiment comprises pressure sources 109L and 109R which are independently provided for brake units 104RL and 104RR of left and right rear wheels 103RL and 104RR, respectively, in stead of common pressure source 109 shown in FIG. 18.

Each of left and right pressure sources 109L and 109R is constructed by a pump 110L, 110R and a motor 111L, 111R, as is similar to pressure source 109 for left and right wheels. Pump 110L, 110R driven by motor 111L, 111R discharges working fluid in reservoir 102a to a pump outlet circuit 112L, 112R so that left and right rear wheels 103RL and 103RR are independently braked using pump hydraulic pressures Pprl and Pprr discharged respectively from pump outlet circuits 112L and 112R.

Therefore, pump outlet circuits 112L and 112R are respectively connected to brake units 104RL and 104RR of left and right rear wheels 103RL and 103RR through brake conduits 113L and 113R. Solenoid pressure control valves 125L and 125R are disposed in circuits connecting a drain circuit 117 and pump outlet circuits 112L and 112R, respectively. Further, pressure sensors 121L and 121R for detecting pump pressures Pprl and Pprr are connected to these connecting portions, respectively.

Solenoid pressure control valves 125L and 125R decrease discharge pressures Pprl and Pprr of pumps 110L and 110R by increasing openings of valves 125L and 125R in proportion to the electromagnetic force, respectively. Herein, except when it is necessary that discharge pressures Pprl and Pprr of pumps 110L and 110R are controlled at values higher than master cylinder hydraulic pressure Pm, discharge pressure Pprl and Pprr are controlled at a pressure as same as master cylinder pressure Pm. Only when it is necessary that rear wheel brake hydraulic pressures Prl and Prr are controlled at values higher than master cylinder hydraulic pressure Pm, discharge pressures Pprl and Pprr of pumps 110L and 110R are controlled at values higher than master cylinder hydraulic pressure Pm. Therefore, openings of solenoid pressure control valves 125L and 125R are electronically controlled while feedbacking the detection values of pressures Pprl and Pprr so that the above discussed pressure control is executed.

With the thus arranged brake system according to the present invention, it becomes possible to independently control the braking operations of the left and right wheels using second brake system 114 of an electronic control type. This arrangement enables the vehicle to be certainly decelerated by the braking of the normally operating side rear wheel and the braking of the front wheels using master cylinder hydraulic pressure Pm, even when one of pressure sources 109L and 109R is put in an inoperative state.

Although the embodiment shown in FIG. 20 has been shown and described such that pumps 110L and 110R are driven by motors 111L and 111R respectively, it will be understood that these pumps 110L and 110R may be driven by one common motor.

Figure 21:
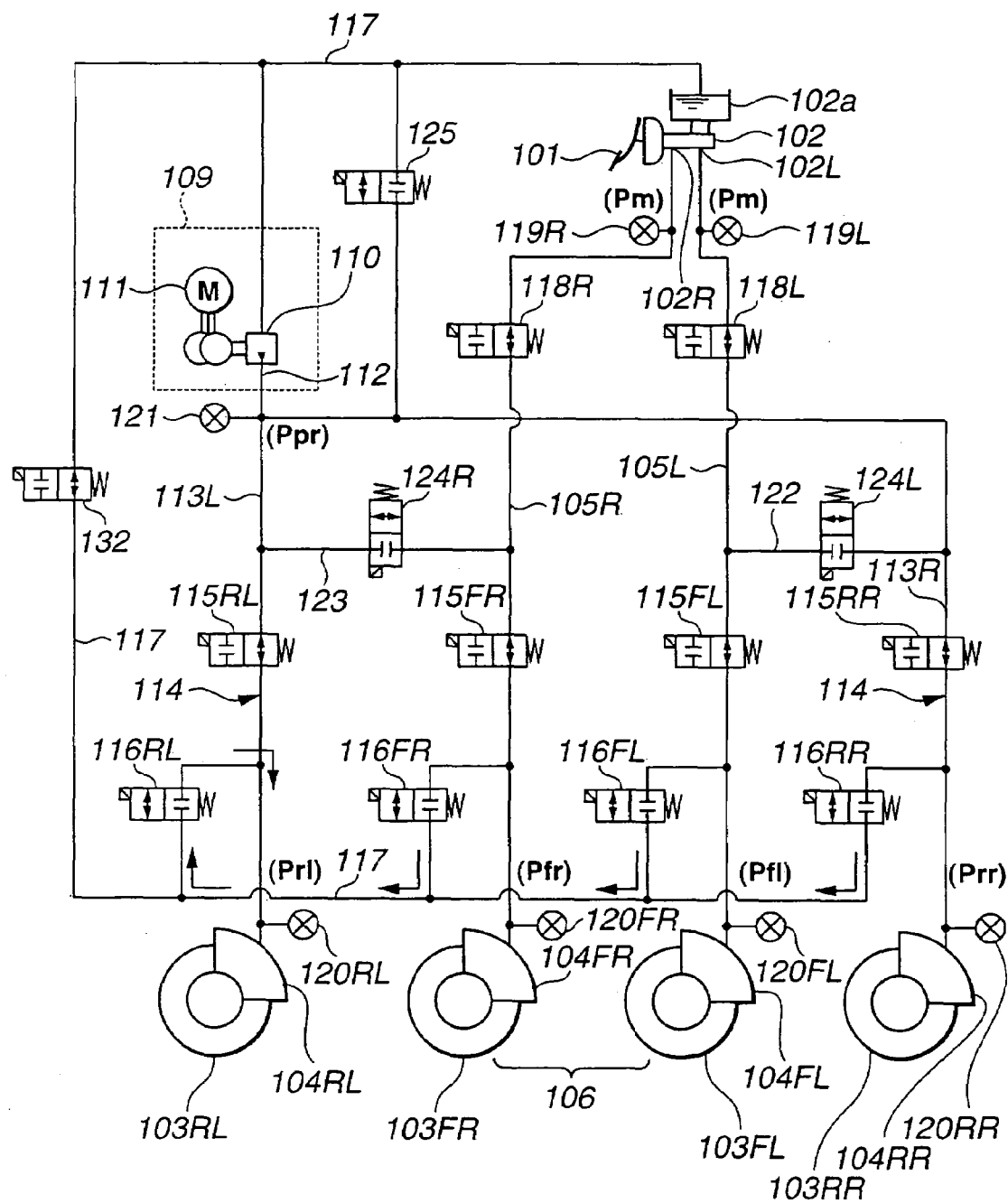
FIG. 21 is a view showing a seventh embodiment of the brake system according to the present invention.

Referring to FIG. 21, there is discussed a seventh embodiment of the brake system according to the present invention. This embodiment shown in FIG. 21 is specifically arranged such that a drain cut valve 132 is disposed in drain circuit 17 which is commonly used by pressure decreasing valves 116FL, 116FR, 116RL and 116RR.

Drain cut valve 132 is of a normally-open solenoid valve, and is arranged to be energized so that drain circuit 117 is closed when one of pressure increasing valves 115FL, 115FR, 115RL and 115RR and pressure decreasing valves 116FL, 116FR, 116RL and 116RR is stuck at an energized state (not-normal state), in order to prevent the hydraulic pressure to be applied to brake units 104FL, 104FR, 104RL and 104RR from being discharged through drain circuit 117 to reservoir 102a. Drain cut valve 132 may be of a normally-closed solenoid valve and may be arranged to be opened except when malfunction is occurred.

With the thus arranged brake system according to the present invention, for example, even when left rear wheel 103RL is put in a braking inoperative state due to the sticking of pressure increasing valve 115RL at closed state, by energizing pressure decreasing valve 116RL relating to pressure increasing valve 115RL to be opened and by energizing one of the other pressure decreasing valves 116FL, 116FR and 116RR to be opened, brake hydraulic pressure of the normally operating brake unit is supplied to left rear wheel brake unit 104RL through pressure decreasing valve 116RL. This arrangement prevents the left rear wheel 103RL from being put in brake inoperative state.

This advantage of this arrangement is maintained as far as at least one of pressure increasing valves 115FL, 115FR, 115RL and 11SRR is operating without generating sticking. Accordingly, the thus arranged brake system is valuable in safety. Further, when it is detected that one of pressure decreasing valves 116FL, 116FR, 116RL and 116RR is stuck at open state, drain cut value 32 is closed to prevent hydraulic pressure operating in each brake unit from being discharged through drain circuit 117 to reservoir 102a. This arrangement also prevents the trouble of the above discussed braking inoperative state.

Figure 22:
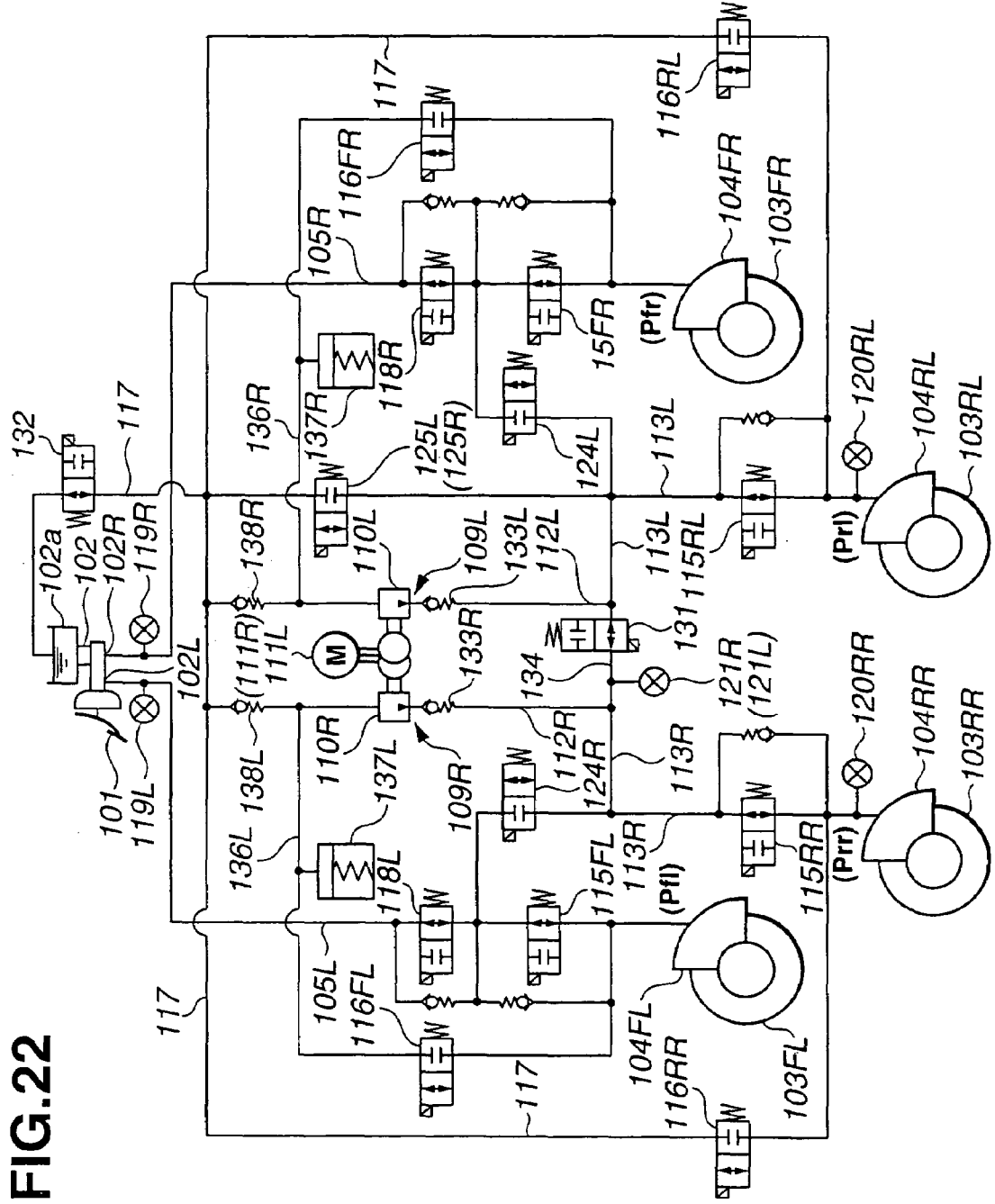
FIG. 22 is a view showing an eighth embodiment of the brake system according to the present invention.

Referring to FIG. 22, there is discussed an eighth embodiment of the brake system which comprises all structural elements discussed in the previously discussed embodiments shown in FIGS. 18 through 21. The same elements are denoted by same reference numerals, and the explanation thereof is omitted herein. In this embodiment, left and right rear wheel brake hydraulic conduits 113L and 113R (pump discharge circuits 112L and 112R) are fluidly connected by a circuit 134. Fail-safe valve 131 of a solenoid type is provided in circuit 134. This fail-safe valve 131 is similar to that shown in FIG. 19 and is of a normally-open type, and performs a function of canceling a difference between the pressure fluctuation phases of pumps 110L and 10R by the opening operation of fail-safe valve 131.

When one of pumps 110L and 110R is put in malfunction state, that is, in fail-safe mode, fail-safe valve 131 is closed to shut off a fluid communication between left and right rear wheel brake hydraulic pressure conduits 113L and 113R.

This arrangement enables the brake system to function as two circuit brake system as is similar to the arrangement shown in FIG. 19, and further prevents the disabled pump 110L or 110R from affecting the normal pump 110R or 110L.

In this embodiment, accumulators 137L and 137R are connected to drain circuits 136L and 136R of pressure decreasing valves 116FL and 116FR for front wheels, respectively. These accumulators 137L and 137R store the fluid drained through pressure decreasing valves 116FL and 116FR and supply the stored fluid to inlet ports of pumps 110L and 110R together with fluid passing through check valves 138L and 138R, respectively. This arrangement improves effective utilization of hydraulic pressure.

Figure 23:
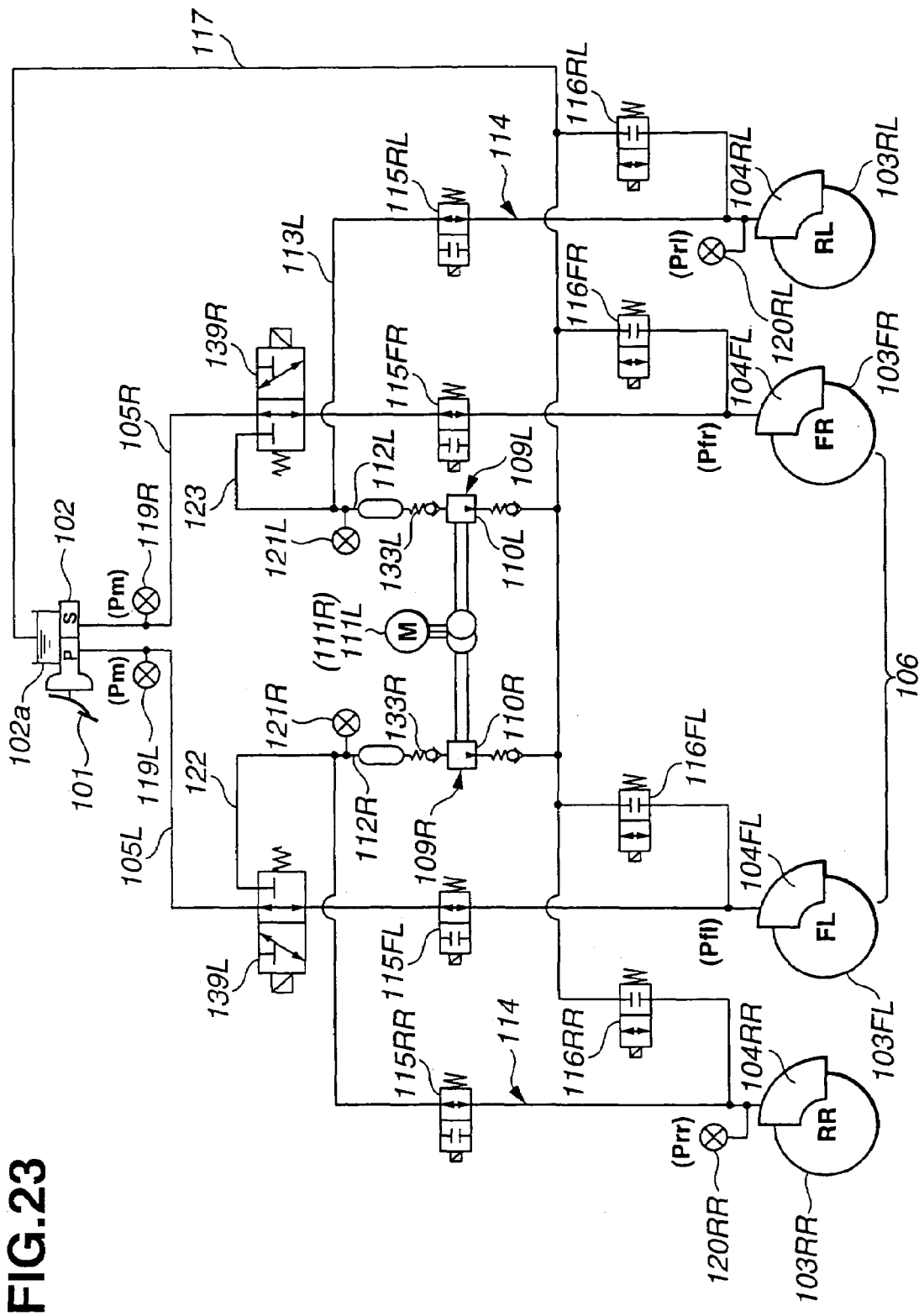
FIG. 23 is a view showing a ninth embodiment of the brake system according to the present invention.

FIG. 23 shows a ninth embodiment of the brake system which comprises all structural elements discussed in the previously discussed embodiments shown in FIGS. 18 through 20. The same elements are denoted by same reference numerals, and the explanation thereof is omitted herein. In this embodiment, one three-port selector valve 139L, 139R is employed instead of two two-port selector valves for each of master cut valves 118L and 118R and each of pressure source selector valves 124L and 124R.

By de-energizing these three-port selector valves 139L and 139R, brake conduits 105L and 105R are opened while communication passages 122 and 123 are closed. On the other hand, when left and right front wheel brake hydraulic pressures Pfl and Pfr are independently controlled, by energizing these three-port selector valves 139L and 139R, brake conduits 105L and 105R are closed while communication passages 122 and 123 are opened.

With the thus arranged ninth embodiment according to the present invention which comprises three-port selector valves 139L and 139R, it becomes possible to decrease the number of parts of solenoid valves and to simplify the construction of the brake system. This gains the advantage in cost.

Figure 24:
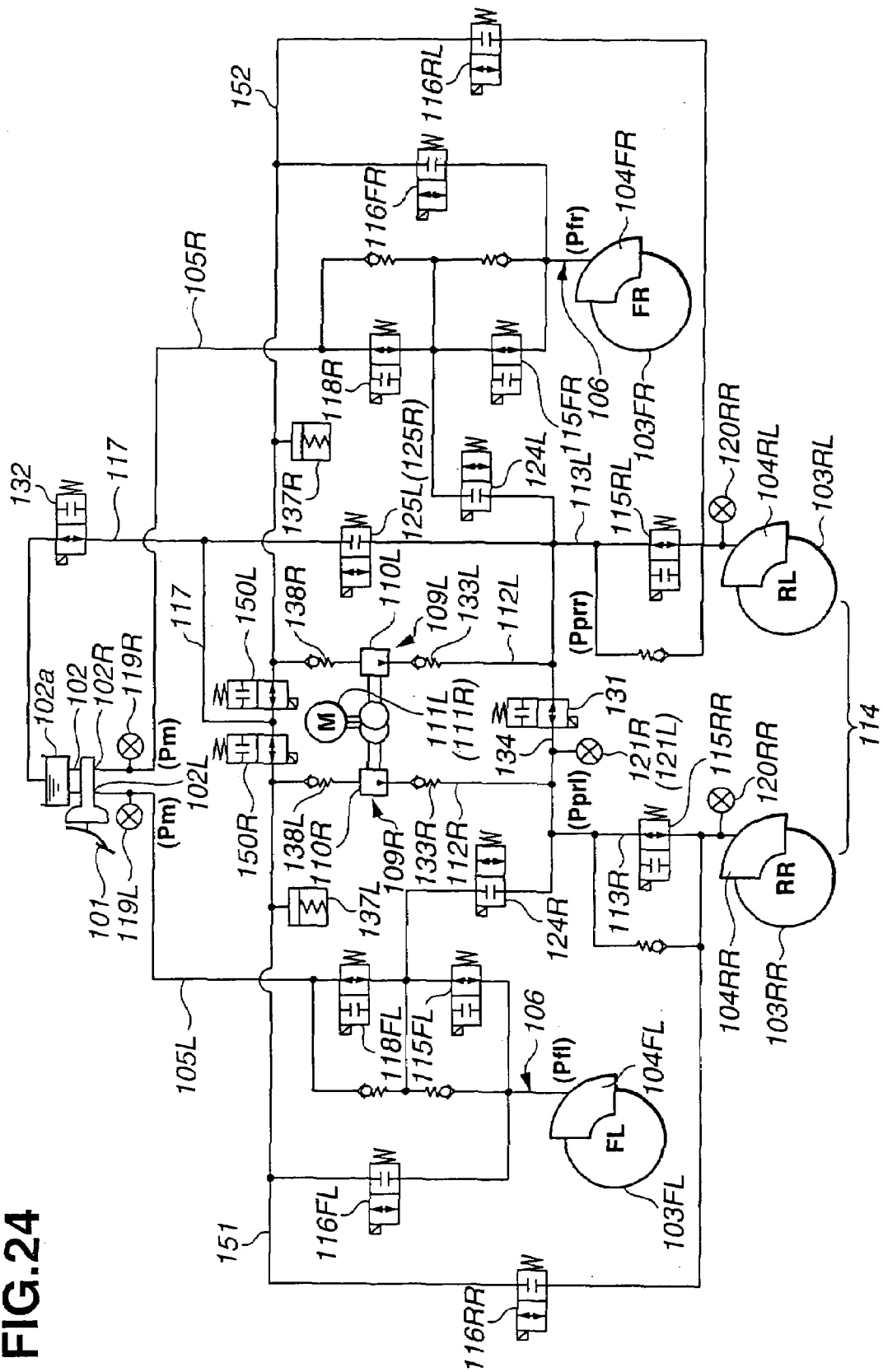
FIG. 24 is a view showing a tenth embodiment of the brake system according to the present invention.

FIG. 24 shows a tenth embodiment of the brake system which comprises all structural elements discussed in the previously discussed embodiments shown in FIGS. 18 through 21 and a discharge block valve. The same elements are denoted by same reference numerals, and the explanation thereof is omitted herein.

In this embodiment, drain circuits 151 and 152 are connected to an upstream side of drain circuit 117 connected to reservoir 102a. Drain circuit 151 is connected to pressure decreasing valves 116RR and 116FL, accumulator 137L and a pump inlet of pressure source 109R. A check valve 138L is disposed at the pump inlet of pressure source 109R to allow fluid from only flowing from drain circuit 151 to the pump inlet. Similarly, drain circuit 152 is connected to pressure decreasing valves 116RL and 116FR, accumulator 137R and a pump inlet of pressure source 109L. A check valve 138R is disposed at the pump inlet of pressure source 109L to allow fluid from only flowing from drain circuit 152 to the pump inlet.

Herein, discharge block valve 150R is of a normally-open solenoid valve and is closed when brake hydraulic pressure Pfl is controlled by opening first pressure decreasing valve 116FL or pressure source selector valve 124R. Similarly, discharge block valve 150L is of a normally-open solenoid valve and is closed when brake hydraulic pressure Pfr is controlled by opening first pressure decreasing valve 116FR or pressure source selector valve 124L.

An elastic member in a compressed state is disposed in each of accumulators 137L and 137R so that accumulators 137L and 137R can store working fluid when the hydraulic pressures in drain circuits 151 and 152 become higher than the atmospheric pressure, respectively, and discharge the stored working fluid when the hydraulic pressures in drain circuits 151 and 152 become equal to the atmospheric pressure, respectively.

Therefore, when discharge block valve 150R, 150L is closed as discussed above, the working fluid in master cylinder 102 and brake conduit 105L, 105R flows into accumulator 137L, 137R. When brake pedal 101 is returned, the working fluid stored in accumulator 137L, 137R is returned to drain circuit 151, 152.

Subsequently, there is discussed the manner of operation of this embodiment of the brake system according to the present invention.

When the driver depresses brake pedal 101 to decelerate the vehicle, pressure source selector valves 124R and 124L and pressure decreasing valves 116FL and 116FR are closed during the normal braking operation. Accordingly, mater cylinder hydraulic pressure Pm of first brake system 106 is supplied to brake units 104FL and 104FR through master cut valves 118L and 118R in open state and pressure increasing valves 115FL and 115FR in open state, respectively, so as to execute the braking of left and right front wheels 103FL and 103FR.

During this normal braking, fail-safe valve 131 of second brake system 114 is put in open state so that pump discharge pressures Pprl and Pprr take a common pressure. By executing the opening control of pressure increasing valves 115RL and 115RR, pressure decreasing valves 116RL and 116RR and solenoid pressure control valve 25L (25R), pump discharge pressures Pprl and Pprr of pressure sources 109R and 109L are modified at rear wheel hydraulic pressures Prl and Prr, and then the modified pressures Prl and Prr are supplied respectively to brake units 104RL and 104RR of left and right rear wheels 103RL so as to achieve the braking of left and right rear wheels 103RL and 103RR.

During the braking of rear wheels 103RL and 103RR in the anti-skid brake system (ABS), the traction control system (TCS) or the vehicle dynamics control (VDC), left and right rear wheel brake hydraulic pressures Prl and Prr are controlled respectively at the target values as similar to the normal control, and are supplied to brake units 104RL and 104RR, respectively.

Further, during the braking of left front wheels 103FL under the anti-skid brake system (ABS), when left front wheel hydraulic pressure Pfl of first brake system 106 is controlled, pump pressure Pprl is supplied to brake unit 104FL by opening pressure source selector valve 124R, and the openings of pressure increasing valve 115FL and pressure decreasing valve 116FL are controlled, and discharge block valve 150R is closed. Further, a passage route of the anti-skid control side and a passage route of non anti-skid control side are completely separated by separating left and right pump outlet circuits 112R and 112L through the closing of fail-safe valve 131. Solenoid pressure control valve 125 is kept closed to cut the fluid communication between second brake system 114 and reservoir 102a. Pressure source selector valve 124L is also kept closed. That is, the braking at the non anti-skid control side is the same as the normal braking.

Similarly, when right front wheel hydraulic pressure Pfr of first brake system 106 is controlled, the control as is similar to the above discussed control is executed. In addition, discharge block valve 150L is closed to completely separate the passage route of the anti-skid control side and the passage route of non anti-skid control side.

Further, even when both of brake hydraulic pressures Pfl and Pfr are controlled, the above discussed control is also executed, and both discharge block valves 150R and 150L are closed so as to completely separate the passages of the anti-skid control.

For example, during the braking of left front wheel 103FL is executed under the vehicle dynamics control (VDC), when left front wheel hydraulic pressure Pfl is controlled, pressure source selector valve 124 is opened to supply pump pressure Pprl to brake unit 104FL, and discharge block valve 150R is closed. By separating left and right pump outlet circuits 112R and 112L through the closing of fail safe valve 132, the passage for the vehicle dynamics control (VDC) side and the passage for the non vehicle dynamics control side are completely separated. Further, solenoid pressure control valve 125 is kept closed to cut the fluid communication between second brake system 114 and reservoir 102a. Pressure source selector valve 124L is also kept closed. That is, the braking at the non vehicle dynamics control side is the same as the normal braking.

When the vehicle dynamics control (VDC) is terminated, pressure source selector valve 124R is closed. However, an increased quantity of the working fluid, which is supplied to the left front wheel side of first brake system 106 through pressure source selector valve 124R, flows to reservoir 102a since master cylinder 102 and reservoir 102a are fluidly communicated. Therefore, fluid quantity in master cylinder 102 is kept at normal state.

In case that the brake system is arranged not to comprise discharge block valves 15OR and 150L as shown in FIGS. 18 through 21, when the anti-skid control of front wheels 103FL and 103FR is executed during a brake pedal depressing state, fail-safe valve 131 is closed to separate the passage for the anti-skid control side and the passage for the non anti-skid control side. Further, solenoid pressure control valve 125 is closed to separate second brake system 114 and reservoir 102a. During this period, left and right front wheel hydraulic pressures Pfl and Pfr are independently controlled by opening pressure source selector valves 124L and 124R, by controlling the openings of pressure increasing valves 115FL and 115FR and pressure decreasing valve 116FL and 116FR. Therefore, the working fluid in master cylinder 102 and brake conduits 105L and 105R flows to drain circuit 117 through pressure source selector valves 124L and 124R and second brake system 114.

If the anti-skid control is terminated in response to the releasing of brake pedal 1 while the working fluid in master cylinder 102 is discharged from first brake system 106 to drain circuit 117, pressure source selector valves 124L and 124R and pressure decreasing valves 116FL and 116FR are closed. Therefore, a shortage of the working fluid in master cylinder 102 causes, and the fluid quantity in master cylinder becomes unbalanced. This unbalance degrades the usability of brake pedal 1 for the reason that an initial depressing position of brake pedal 1 and the maximum stroke quantity are changed.

Due to the structural limitation of master cylinder 102, it is impossible to supply the working fluid from reservoir 102a to master cylinder 102 without returning brake pedal 1 to the depression initial position for communicating reservoir 102a and master cylinder 102. However, if the shortage of the working fluid in master cylinder 102 is continued, it becomes impossible to return brake pedal 1 to the depression initial position.

In contrast, since this embodiment of the brake system according to the present invention comprises discharge block valves 150R and 150L, when brake hydraulic pressures Pfl and Pfr are controlled by opening pressure source selector valves 124L and 124R and controlling the openings of pressure increasing valves 115FL, 115FR and pressure decreasing valves 116FL and 116FR, discharge block valves 150R and 150L are closed. Therefore, the working fluid stayed in master cylinder 2 and brake conduits 105L and 105R does not flow out to drain circuit 117 and is stored in accumulators 137L and 137R. Thereafter, when brake pedal 1 is released, the working fluid stored in accumulators 137L and 137R is returned to master cylinder 102 and brake conduits 105L and 105R through drain circuits 151 and 152 and pressure decreasing valves 116FL and 116FR. This arrangement solves the problems caused by a shortage of the working fluid in master cylinder 102.

In this embodiment, when discharging powers of pumps 110R and 110L are very high and pressure sources 109R and 109L are capable of quickly generating high pump pressures Pprl and Pprr, it becomes possible to supply the working fluid from pressure sources 109R and 109L through pressure source selector valves 124L and 124R and pressure increasing valves 115FL and 115FR to master cylinder 2. This enables omitting the provision of accumulators 137L and 137R in the brake system.

Figure 25:
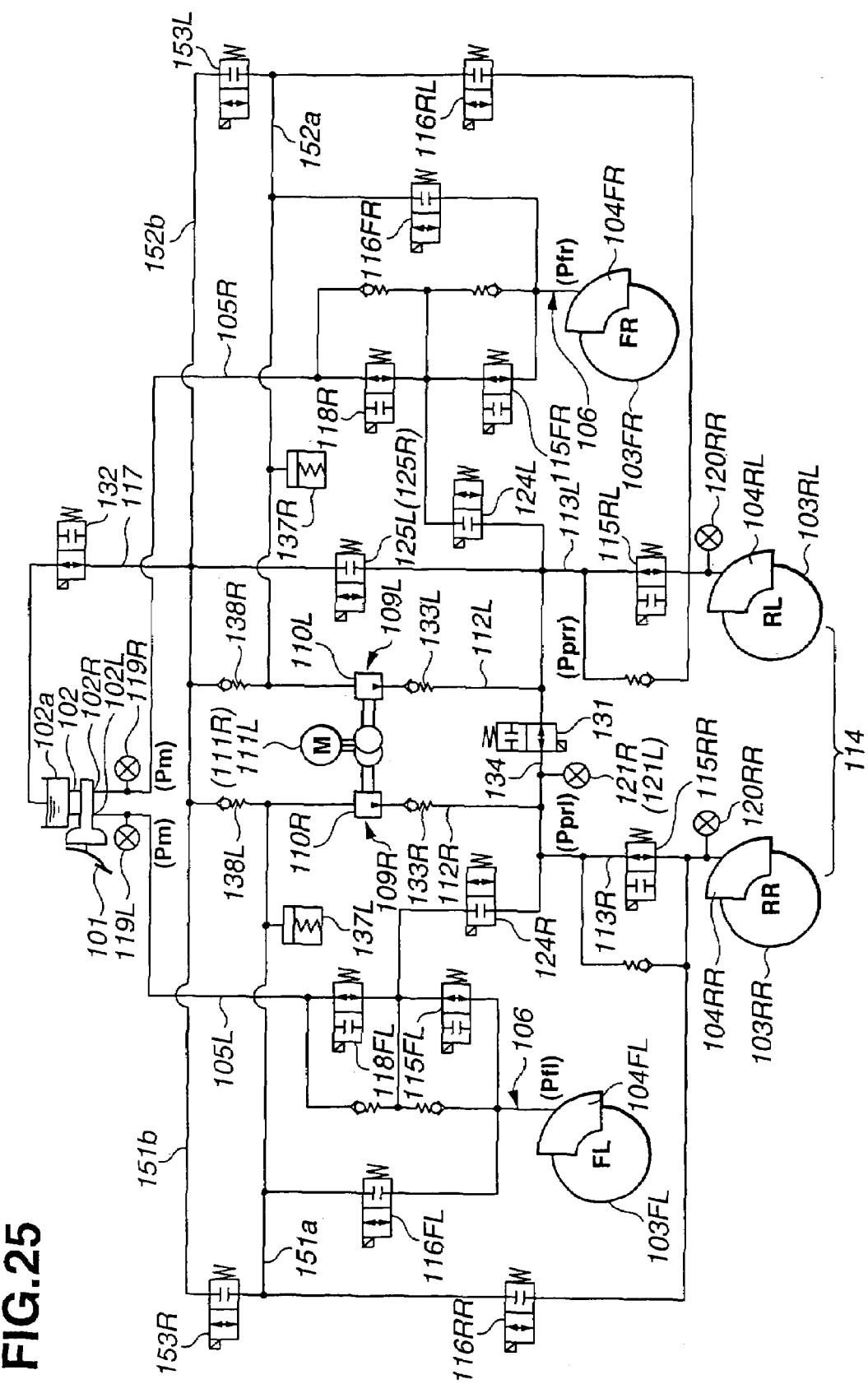
FIG. 25 is a view showing an eleventh embodiment of the brake system according to the present invention.

Referring to FIG. 25, there is discussed an eleventh embodiment of the brake system according to the present invention, which is also cable of obtaining the function obtained by the arrangement of the brake system comprising discharge block valves 150R and 150L.

As shown in FIG. 25, an end of a drain circuit 151a is connected to pressure reducing valve 16RR, and an intermediate portion of drain circuit 51a is connected to pressure decreasing valve 16FL and accumulator 137L. The other end of drain circuit 151a is connected to the pump inlet of pressure source 109R. Further, the end of drain circuit 151a is connected to a drain circuit 151b through discharge block valve 153R, and the other end of drain circuit 151a is connected to a drain circuit 151b through a check valve 138L. Check valve 138L functions to prevent the fluid from flowing from drain circuit 151a to drain circuit 151b and to enable the fluid to be supplied from reservoir 102a to the pump inlet of pressure source 109R. Drain circuit 151b is connected to drain circuit 117. More specifically, reservoir 102a is connected to pressure decreasing valves 116RR and 116FL and the pump inlet of pressure source 109R through drain circuits 117, 151b and 151a. Discharge block valve 153R and check valve 138L are disposed in the drain circuits so as to have a parallel arrangement therebetween.

Similarly, an end of a drain circuit 152a is connected to pressure reducing valve 116RL, and an intermediate portion of drain circuit 152a is connected to pressure decreasing valve 116FR and accumulator 137R. The other end of drain circuit 152a is connected to the pump inlet of pressure source 109L. Further, the end of drain circuit 152a is connected to a drain circuit 152b through discharge block valve 153L, and the other end of drain circuit 152a is connected to a drain circuit 152b through a check valve 138R. Check valve 138R functions to prevent the fluid from flowing from drain circuit 152a to drain circuit 152b and to enable the fluid to be supplied from reservoir 102a to the pump inlet of pressure source 109L. Drain circuit 151b is connected to drain circuit 117. More specifically, reservoir 102a is connected to pressure decreasing valves 116RL and 116FR and the pump inlet of pressure source 109L through drain circuits 117, 152b and 152a. Discharge block valve 153L and check valve 138R are disposed in the drain circuits so as to have a parallel arrangement therebetween.

With this arrangement according to the present invention, when brake hydraulic pressures Pfl and Pfr are controlled by opening pressure source selector valves 124L and 124R and controlling the openings of pressure increasing valves 115FL, 115FR and pressure decreasing valves 116FL and 116FR, discharge block valves 153R and 153L are also closed. Therefore, the working fluid stayed in master cylinder 2 and brake conduits 105L and 105R does not flow out to drain circuit 117 and is stored in accumulators 137L and 137R even if the anti-skid control system becomes operative during the brake pedal depressing state. Thereafter, when brake pedal 1 is released, the working fluid stored in accumulators 137L and 137R is returned to master cylinder 102 and brake conduits 105L and 105R through drain circuits 151 and 152 and pressure decreasing valves 116FL and 116FR. This arrangement solves the problems caused by a shortage of the working fluid in master cylinder 102.

Further, even when discharge block valves 153L and 153R are closed, it is possible to supply the working fluid from reservoir 102a to pressure sources 109R and 109L through check valves 138L and 138R. Accordingly pressure sources 109R and 109L sufficiently generate pump pressures Pprl and Pprr, respectively, even when discharge block valves 153L and 153R are closed. Furthermore, even when the working fluid flows into first brake system 106, the increased quantity of the working fluid flowed into master cylinder 102 flows out to reservoir 102a by communicating master cylinder 102 and reservoir 102a. Therefore, this arrangement solves the problems caused by a shortage of the working fluid in master cylinder 102.

Furthermore, in this embodiment, when discharging powers of pumps 110R and 110L are very high and pressure sources 109R and 109L are capable of quickly generating high pump pressures Pprl and Pprr, it becomes possible to supply the working fluid from pressure sources 109R and 109L through pressure source selector valves 124L and 124R and pressure increasing valves 115FL and 115FR to master cylinder 2. This enables omitting the provision of accumulators 137L and 137R in the brake system.

This application is based on Japanese Patent Applications No. 2003-119646 filed on Apr. 24, 2003, No. 2003-124358 filed on Apr. 28, 2003 and No. 2004-4176 filed on Jan. 9, 2004 in Japan. The entire contents of these Japanese Patent Applications are incorporated herein by reference.

Although the invention has been described above by reference to certain embodiments of the invention, the invention is not limited to the embodiments described above. Modifications and variations of the embodiments described above will occur to those skilled in the art, in light of the above teaching. The scope of the invention is defined with reference to the following claims.

What is claimed is:

1. The brake system wherein the first brake system comprises a first pressure increasing and decreasing valve through which a first brake hydraulic pressure of the first brake system is controlled, and the second brake system comprises a second pressure increasing and decreasing valve through which a second brake hydraulic pressure of the second brake system is controlled according to at least a detection result of a braking state of the first brake system,
wherein the brake system further comprises a pressure source selector valve which is disposed between a circuit connecting the master cylinder of the first brake system and the first pressure increasing valve and a circuit connecting another pressure source of the second brake system and the second pressure increasing and decreasing valve, the pressure source selector valve being normally closed, the pressure source selector valve being opened so as to employ the another pressure source of the second brake system as a pressure source of the first brake system.

2. The brake system as claimed in claim 1, wherein a master cut valve is disposed at a portion near the master cylinder in the circuit connecting the master cylinder of the first brake system and the first pressure increasing and decreasing valve.

3. The brake system as claimed in claim 1, wherein a fail safe valve, which is closed when the pressure source of the second brake system is put in a disabled state, is disposed between the pressure source of the second brake system and the second pressure increasing and decreasing valve, and the pressure source selector valve is closed when the pressure source of the second brake system is put in the disabled state.

4. The brake system as claimed in claim 1, wherein the second brake system is constructed by two independent circuits which independently comprise pressure sources, respectively.

5. The brake system as claimed in claim 1, further comprising a drain cut valve which is disposed in a drain circuit for a pressure decreasing valve of the pressure increasing and decreasing valves for the first brake system and the second brake system.

6. The brake system as claimed in claim 1, further comprising a discharge block valve which is disposed in a drain circuit for a pressure decreasing valve of the pressure increasing and decreasing valves for the first brake system and the second brake system.

7. The brake system as claimed in claim 6, further comprising an accumulator which is connected to the drain circuit upstream of the discharge block valve, the accumulator storing the brake fluid discharged from the master cylinder when the discharge block valve is closed.

8. The brake system as claimed in claim 6, further comprising a reservoir which is connected to the drain circuit downstream of the discharge block valve, another pressure source which is connected to the drain circuit upstream of the discharge block valve so that the brake fluid is supplied to the another pressure source from the drain circuit, and a check valve which is disposed in the drain circuit so as to be disposed in parallel with the discharge block valve.

* * * * *